US012645826B2

(12) United States Patent
Zaret et al.

(10) Patent No.: US 12,645,826 B2
(45) Date of Patent: Jun. 2, 2026

(54) PRIVATE INFORMATION RETRIEVAL WITH HOMOMORPHIC ENCRYPTED INFORMATION

(71) Applicant: The Johns Hopkins University, Baltimore, MD (US)

(72) Inventors: David R. Zaret, Columbia, MD (US); Roxanne W. Holden, Silver Spring, MD (US); Vivian Maloney, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 116 days.

(21) Appl. No.: 18/614,245

(22) Filed: Mar. 22, 2024

(65) Prior Publication Data

US 2024/0330500 A1 Oct. 3, 2024

Related U.S. Application Data

(60) Provisional application No. 63/491,831, filed on Mar. 23, 2023.

(51) Int. Cl.
G06F 21/62 (2013.01)
G06F 21/60 (2013.01)
(52) U.S. Cl.
CPC ........ G06F 21/6227 (2013.01); G06F 21/602 (2013.01)
(58) Field of Classification Search
CPC ............................ G06F 21/6227; G06F 21/602
See application file for complete search history.

(56) References Cited

U.S. PATENT DOCUMENTS

| | | | |
|---|---|---|---|
| 9,729,525 B1 * | 8/2017 | Kolman | ................ G06F 16/951 |
| 11,093,635 B2 | 8/2021 | Fink et al. | |
| 11,700,110 B2 | 7/2023 | Jackson, II et al. | |
| 11,829,503 B2 | 11/2023 | Fink et al. | |
| 11,977,657 B1 * | 5/2024 | Calafato | ............. G06F 21/6227 |

(Continued)

OTHER PUBLICATIONS

K. Liang, X. Huang, F. Guo, and J.K. Liu, "Privacy-preserving and regular language search over encrypted cloud data," IEEE Transactions on Information Forensics and Security, vol. 11, No. 10, pp. 2365-2376, 2016.

(Continued)

*Primary Examiner* — Lynn D Feild
*Assistant Examiner* — Ethan V Vo
(74) *Attorney, Agent, or Firm* — Todd Richard Farnsworth

(57) ABSTRACT

A system for performing private information retrieval may include a data requesting computer that is configured to receive a query string, homomorphically encrypt the query string to generate an encrypted query, transmit the encrypted query to a data repository computer, and receive resultant encrypted datasets. The data repository computer may be configured to access a database comprising a plurality of datasets, receive the encrypted query, and perform a search of the plurality of datasets to identify the resultant encrypted datasets that include data that matches the encrypted query for provision to the data requesting computer. The search may be performed such that encryption of the encrypted query is maintained while performing computational operations of the search.

18 Claims, 7 Drawing Sheets

(56) References Cited

U.S. PATENT DOCUMENTS

| | | | |
|---|---|---|---|
| 2014/0233727 A1* | 8/2014 | Rohloff | G06F 16/3347 |
| | | | 380/28 |
| 2015/0039912 A1* | 2/2015 | Payton | H04L 9/14 |
| | | | 713/193 |
| 2016/0283731 A1* | 9/2016 | Chow | G06F 16/9027 |
| 2017/0032142 A1* | 2/2017 | Augot | H04L 9/085 |
| 2017/0323118 A1* | 11/2017 | Fink | G06F 21/6245 |
| 2018/0198601 A1* | 7/2018 | Laine | H04L 9/3239 |
| 2019/0050591 A1* | 2/2019 | Rane | G06F 21/6227 |
| 2019/0050604 A1* | 2/2019 | Weber | G06F 21/76 |
| 2022/0121770 A1* | 4/2022 | Cousins | H04L 9/0643 |
| 2023/0085239 A1* | 3/2023 | Adir | H04L 63/0428 |
| | | | 713/189 |

OTHER PUBLICATIONS

Y. Yang, X. Zheng, C. Rong, and W. Guo, "Efficient regular language search for secure cloud storage," IEEE Transactions on Cloud Computing, vol. 8, No. 3, pp. 805-818, 2020.

X. Wang, T. Luo, and J. Li, "An efficient fully homomorphic encryption scheme for private information retrieval in the cloud," International Journal of Pattern Recognition and Artificial Intelligence, vol. 34, No. 04, 2020, 21 pages.

P. A. Tamgave, A. A. Manjrekar, and S. Khot, "Regular Language Search Over Encrypted Cloud Data Using Taken Generation: A Review Paper," In: Raj, J., Bashar, A., Ramson, S. (eds) Innovative Data Communication Technologies and Application. ICIDCA 2019. Lecture Notes on Data Engineering and Communications Technologies, vol. 46. Springer, Cham. https://doi.org/10.1007/978-3-030-38040-3_26.

C. Aguilar-Melchor, J. Barrier, L. Fousse, and M.O. Killijian, "XPIR: Private Information Retrieval for Everyone," Proceedings on Privacy Enhancing Technologies, vol. 2, pp. 155-174, 2016.

R. Ostrovsky and W. Skeith, "A Survey of Single Database PIR: Techniques and Applications," 20 pages, URL: http://eprint.iacr.org/2007/059, 2007.

F. Kerschbaum, "Practical Private Regular Expression Matching," in IFIP International Information Security Conference, Springer, 2006, pp. 461-470.

N. Gama, M. Izabachene, P. Q. Nguyen, and X. Xie, "Structural Lattice Reduction: Generalized Worst-Case to Average-Case Reductions and Homomorphic Cryptosystems," in Annual International Conference on the Theory and Applications of Cryptographic Techniques, Springer, 2016, pp. 528-558.

I. Chillotti, N. Gama, M. Georgieva, and M. Izabachene, "Faster Packed Homomorphic Operations and Efficient Circuit Bootstrapping for TFHE," 2017, T. Takagi and T. Peyrin (Eds.): ASIACRYPT 2017, Part I, LNCS 10624, pp. 377-408, 2017. https://doi.org/10.1007/978-3-319-70694-8_14.

"NuFHE, a GPU-powered torus FHE implementation," [Online]. Available at: https://nufhe.readthedocs.io/en/latest/. Last accessed on Jun. 20, 2024.

Y. Yamada, K. Rohloff, and M. Oguchi, "Homomorphic Encryption for Privacy-Preserving Genome Sequences Search," in 2019 IEEE International Conference on Smart Computing (SMARTCOMP), 2019, pp. 7-12. DOI: 10.1109/SMARTCOMP.2019.00021.

J. A. Brzozowski, "Derivatives of Regular Expressions," Journal of the ACM (JACM), vol. 11, No. 4, pp. 481-494, 1964.

S. Owens, J. Reppy, and A. Turon, "Regular-Expression Derivatives Re-Examined," Journal of Functional Programming, vol. 19, No. 2, pp. 173-190, 2009.

N. Genise, C. Gentry, S. Halevi, B. Li, and D. Micciancio, "Homomorphic Encryption for Finite Automata," in International Conference on the Theory and Application of Cryptology and Information Security, Springer, 2019, pp. 473-502.

R. A. Fink, D. R. Zaret, R. B. Stonehirsch, R. M. Seng, and S. M. Tyson, "Streaming, Plaintext Private Information Retrieval using Regular Expressions on Arbitrary Length Search Strings," in 2017 IEEE Symposium on Privacy-Aware Computing (PAC), IEEE, 2017, pp. 107-118.

S. D. Galbraith and L. Zobernig, "Obfuscating Finite Automata," in International Conference on Selected Areas in Cryptography, Springer, Nature, 2020, pp. 90-114.

M. A. Will and R. K. Ko, Chapter 5—"A guide to Homomorphic Encryption," The Cloud Security Ecosystem, Syngress, 2015, pp. 101-127.

J. Dong, "Accelerating BGV Scheme of Fully Homomorphic Encryption using GPUs," Ph.D. dissertation, Worcester Polytechnic Institute, 2016.

Palisade Homomorphic Encryption Software Library | An Open-Source Lattice Crypto Software Library, available at: https://palisade-crypto.org/. Retrieved on Jun. 20, 2024.

I. Chillotti, N. Gama, M. Georgieva, and M. Izabach' Ene, "TFHE: Fast Fully Homomorphic Encryption over the Torus," Journal of Cryptology, vol. 33, No. 1, pp. 34-91, 2020.

C. Caldwell, Proof of Fermat's Little Theorem, available at: https://t5k.org/notes/proofs/FermatsLittleTheorem.html. Retrieved on Jun. 20, 2024.

M. Chase, H. Chen, J. Ding, S. Goldwasser, S. Gorbunov, J. Hoffstein, K. Lauter, S. Lokam, D. Moody, T. Morrison, A. Sahai, and V. Vaikuntanathan, "Security of Homomorphic Encryption," HomomorphicEncryption.org, Redmond WA, USA, Tech. Rep., Jul. 2017.

M. Y. Alhassan, D. Gunther, A' . Kiss, and T. Schneider, "Efficient and Scalable Universal Circuits," Journal of Cryptology, vol. 33, No. 3, pp. 1216-1271, 2020.

* cited by examiner

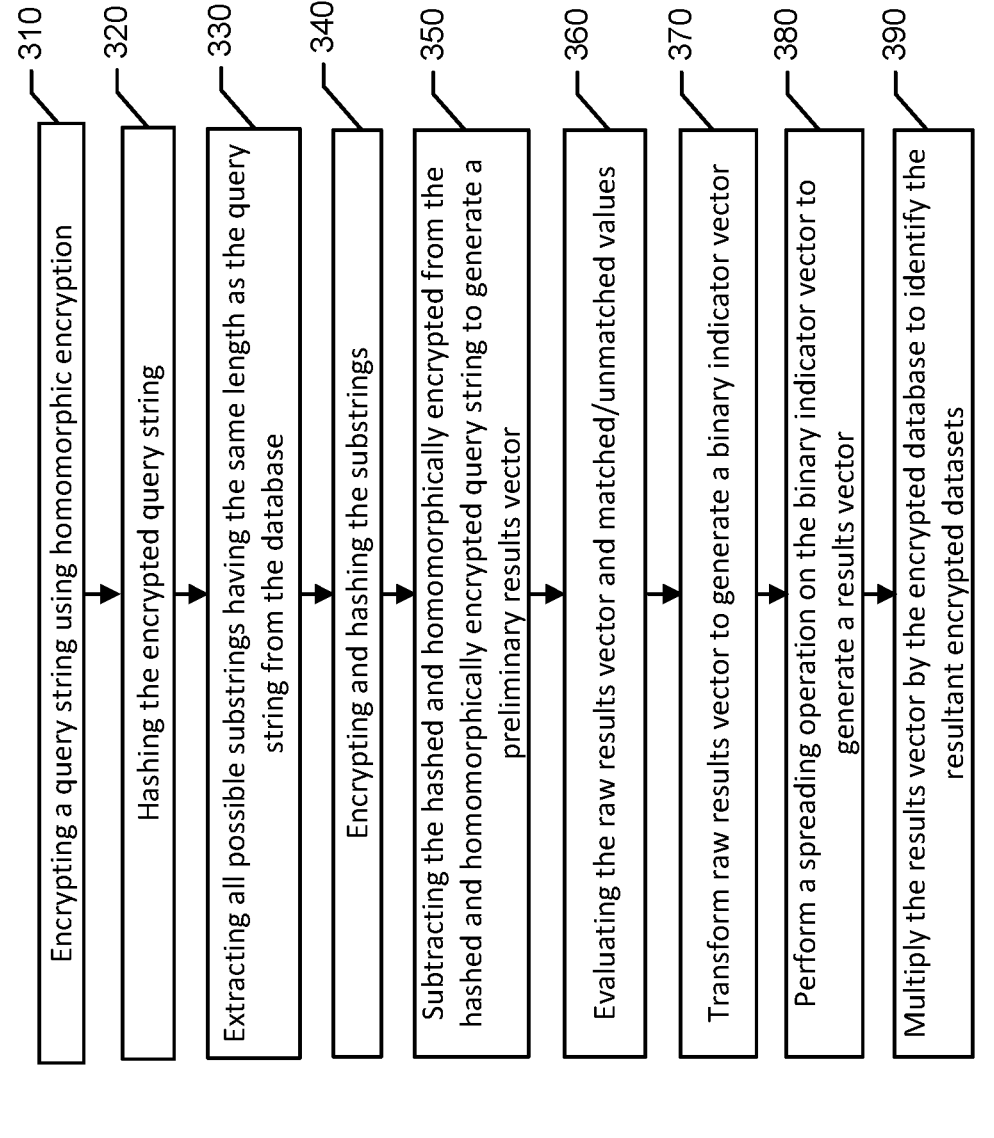

310 — Encrypting a query string using homomorphic encryption

320 — Hashing the encrypted query string

330 — Extracting all possible substrings having the same length as the query string from the database 340 — Encrypting and hashing the substrings 350 — Subtracting the hashed and homomorphically encrypted from the hashed and homomorphically encrypted query string to generate a preliminary results vector 360 — Evaluating the raw results vector and matched/unmatched values 370 — Transform raw results vector to generate a binary indicator vector 380 — Perform a spreading operation on the binary indicator vector to generate a results vector 390 — Multiply the results vector by the encrypted database to identify the resultant encrypted datasets

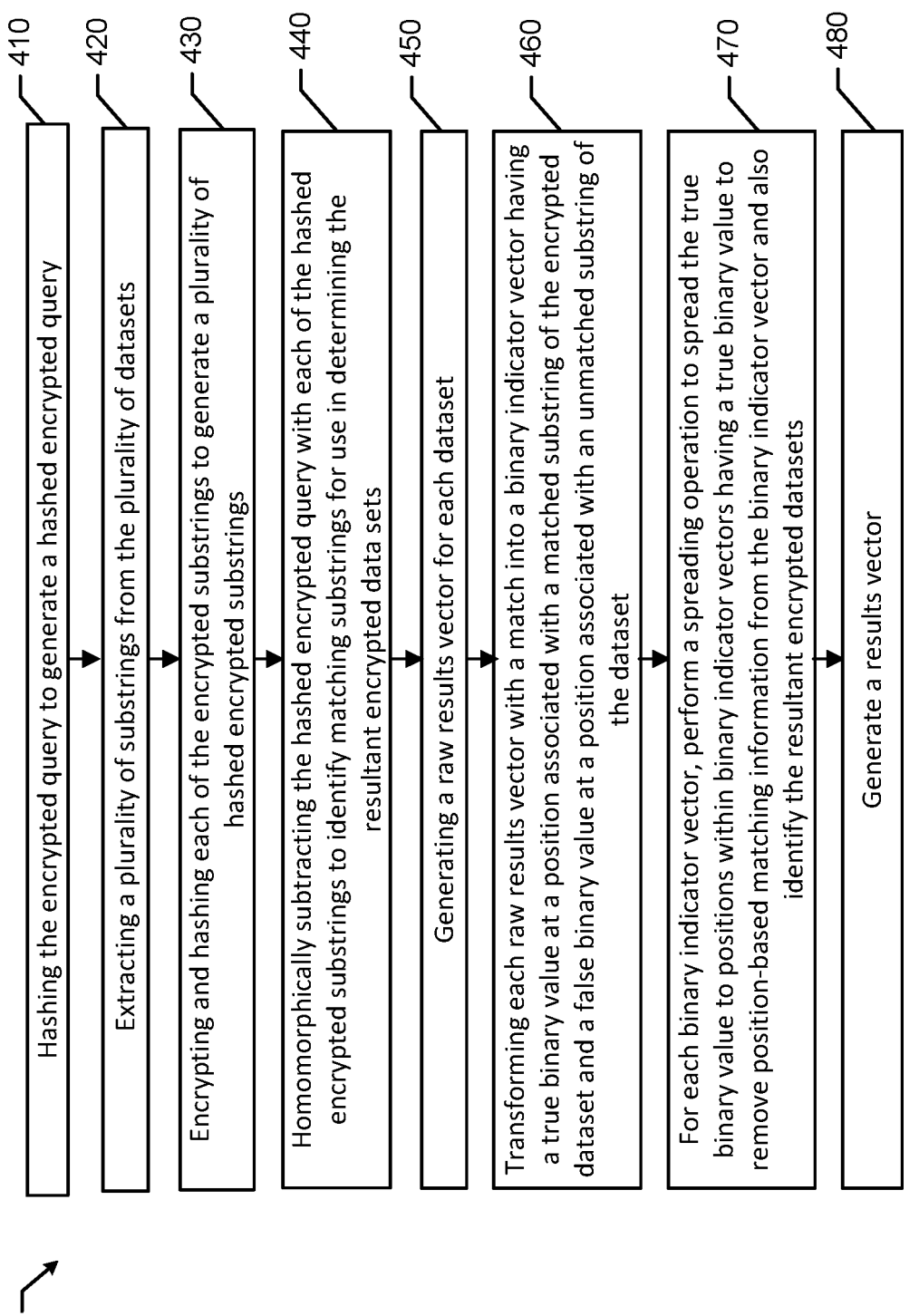

400

410 — Hashing the encrypted query to generate a hashed encrypted query

420 — Extracting a plurality of substrings from the plurality of datasets

430 — Encrypting and hashing each of the encrypted substrings to generate a plurality of hashed encrypted substrings 440 — Homomorphically subtracting the hashed encrypted query with each of the hashed encrypted substrings to identify matching substrings for use in determining the resultant encrypted data sets 450 — Generating a raw results vector for each dataset 460 — Transforming each raw results vector with a match into a binary indicator vector having a true binary value at a position associated with a matched substring of the encrypted dataset and a false binary value at a position associated with an unmatched substring of the dataset 470 — For each binary indicator vector, perform a spreading operation to spread the true binary value to positions within binary indicator vectors having a true binary value to remove position-based matching information from the binary indicator vector and also identify the resultant encrypted datasets 480 — Generate a results vector

FIG. 4

PRIVATE INFORMATION RETRIEVAL WITH HOMOMORPHIC ENCRYPTED INFORMATION

CROSS-REFERENCE TO RELATED APPLICATIONS

This application claims the benefit of U.S. Provisional Application No. 63/491,831 filed on Mar. 23, 2023, the entire contents of which are hereby incorporated herein by reference.

STATEMENT OF GOVERNMENTAL INTEREST

This invention was made with U.S. Government support. The government has certain rights in the invention.

TECHNICAL FIELD

Example embodiments generally relate to information retrieval and, more particularly, relate to information retrieval with query privacy.

BACKGROUND

The amount of information that is available, for example, via the Internet continues to increase at an accelerating pace. Being able to access data via networks such as the Internet through searches and queries continues to be an important area for innovation, particularly in situations where privacy of the queries and the results are a concern. As such, not only is the efficiency with which queries can retrieve data becoming increasingly important, but so too are aspects of query privacy.

BRIEF SUMMARY OF SOME EXAMPLES

According to some example embodiments, a system for performing private information retrieval is described. The example system may comprise a data requesting computer, which may be configured to receive a query string, homomorphically encrypt the query string to generate an encrypted query, transmit the encrypted query to a data repository computer, and receive resultant encrypted datasets. The data repository computer may be configured to access a database comprising a plurality of datasets, receive the encrypted query, and perform a search of the plurality of datasets to identify the resultant encrypted datasets that include data that matches the encrypted query. In this regard, performing the search may comprise maintaining encryption of the encrypted query while performing computational operations of the search. Additionally, the resultant encrypted datasets may be homomorphically encrypted. The query string may be a regular expression or a plurality of encrypted substrings may be extracted from the plurality of datasets. The data repository computer may also transmit the resultant encrypted datasets to the data requesting computer.

According to some example embodiments, a method for performing private information retrieval is described. The example method may comprise accessing, by a data repository computer, a database comprising a plurality of datasets and receiving an encrypted query. The encrypted query may be a homomorphically encrypted query string. The example method may further comprise performing a search of the plurality of datasets to identify resultant encrypted datasets that include data that matches the encrypted query. In this regard, performing the search may comprise maintaining encryption of the encrypted query while performing computational operations of the search. The resultant encrypted datasets may be homomorphically encrypted. Further, the example method may comprise transmitting the resultant encrypted datasets to the data requesting computer.

According to some example embodiments, an apparatus for performing private information retrieval is described. The apparatus may comprise processing circuitry configured to access a database comprising a plurality of datasets and receive, via a public network, an encrypted query. The encrypted query may be a homomorphically encrypted query string. The processing circuitry may be further configured to perform a search of the plurality of datasets to identify resultant encrypted datasets that include data that matches the query. Performing the search, according to some example embodiments, may comprise maintaining encryption of the encrypted query while performing computational operations of the search. Additionally, the resultant encrypted datasets may be homomorphically encrypted. The processing circuitry may also be configured to transmit the resultant encrypted datasets to a data requesting computer via the public network.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 3 illustrates an example flowchart for performing a private information retrieval via a substring search according to an example embodiment;

FIG. 4 illustrates another example flowchart for performing a private information retrieval via a substring search according to an example embodiment;

DETAILED DESCRIPTION

Figure 1:
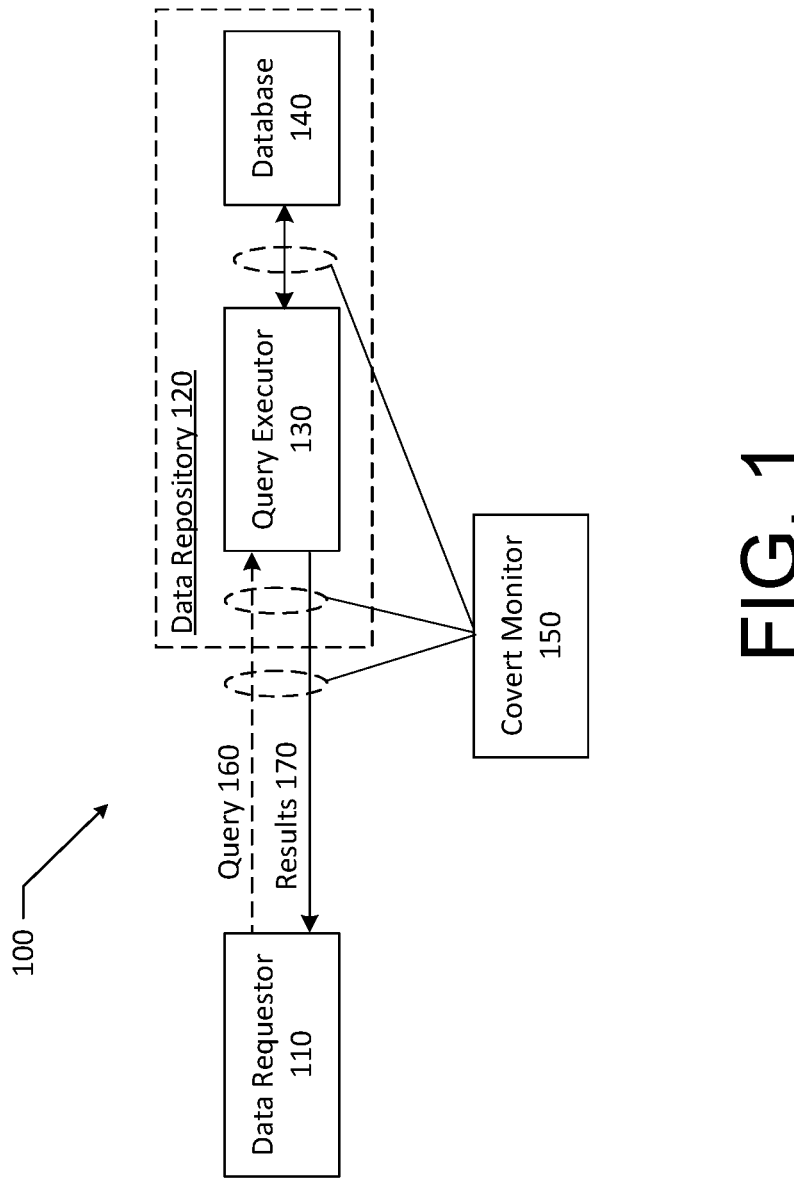
FIG. 1 illustrates a block diagram of a system of interconnected components for performing a private query search according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

According to various example embodiments, example implementations and devices for performing private information retrieval (PIR) are provided. In this regard, there is an increasing need for the ability to privately search for and retrieve data from data repositories that may be monitored and maintained by entities that are not be trusted or are not trusted to have access to the query content (e.g., in the form of a query string) that are being used to locate information in the data repositories. The term private, as used herein, is used in association with data or a technique that is not known to an entity that still performs operations based on the data or technique. In many circumstances, the content of the queries themselves may include sensitive information (e.g., names, transaction information, locations, or the like) that should not be disclosed to an untrusted entity. In this regard, the content of the query may remain private, even though the query may be executed on a computer system operated by the untrusted entity. As such, the query itself and the results of the query are concealed from the untrusted entity in a PIR implementation.

According to some example embodiments, the implementations described herein operate to permit a data requestor to transmit a query to a data repository, perform the query at the data repository, and receive query results while maintaining the privacy of the query content and the retrieved results with respect to, for example, the query executor. In this regard, amongst other aspects, some example embodiments leverage the encryption and computation functionalities of homomorphic encryption to perform such queries. For example, according to some example embodiments, a data requesting computer may be configured to receive a query that comprises a query string, which may be the content, for example, characters or data, that the query is searching for in the database. The query string may be homomorphically encrypted to generate an encrypted query to maintain privacy for the query content. The encrypted query may be transmitted to a data repository computer, which may be untrusted, to perform the query. As part of a PIR implementation, the data repository computer will be unable to determine the terms or content of the query, and the returned results from the query will also remain private and unknown to the data requesting computer, even though the data repository computer performs the query and returns the results.

As mentioned above, PIR has been developed to provide privacy-preserving information exchange where both the query and the results are not known by the database being queried. In this regard, PIR may operate to allow parties to share, for example, specific agreed-upon information without revealing any additional information from a database that may be sensitive or proprietary. Most conventional approaches to PIR solutions can only perform exact string matching as a querying technique, which significantly limits the scope of potential applications that use such conventional PIR approaches. However, according to some example embodiments, a more powerful solution is described herein that implements a querying process which can perform advanced searches, such as searches of regular expressions, to parse data, such as documents, based on such advanced search patterns to extract relevant data within a PIR implementation.

In some PIR implementations, according to some example embodiments, a data repository computer may be configured to access a database comprising a plurality of encrypted datasets, where each of the encrypted datasets is homomorphically encrypted. Initially, the database need not be encrypted in some example embodiments. However, according to some example embodiments, the data repository can encrypt the database, for example, prior to or after receiving the encrypted query. The data repository (or a related operator) may use, for example, a public/private key technique for encrypting. For example, the data repository may use a public key to encrypt the database, according to some example embodiments, prior to performing a query comparison. In some example embodiments, the same public key may be used to encrypt the query at the data requesting computer. The datasets may be any type of information set, such as documents, ledgers, notes, or the like, and the datasets may be stored in, for example, a native format to allow for searching against the data in its native format, rather than only searching against extracted metadata or specific fields. The data requesting computer may also receive the query, as an encrypted query, and perform a search of the plurality of datasets to identify resultant encrypted datasets that include data that matches the encrypted query. According to some example embodiments, the search may be performed against encrypted or unencrypted datasets. As further described below, according to some example embodiments, a characteristic of the encrypted query may be determined (e.g., a length of the encrypted query) and the characteristic may be used to operate on the database or the datasets in a preliminary, for example, formatting operation to prepare the datasets for the search. According to some example embodiments, the search may be performed while still maintaining the homomorphic encryption of the encrypted query. In this regard, computational operations of the search may operate directly upon the encrypted query and the datasets (i.e., without the need for decrypting and encrypting the encrypted query) to determine the resultant encrypted datasets, which are also provided in a homomorphically encrypted form. Once determined, the resultant encrypted datasets may be transmitted to the data requesting computer for local decrypting and analysis.

Some example embodiments described herein may be applied in a wide variety of practical applications that involve information sharing between parties that would prefer to maintain privacy with respect to the search. One example scenario may involve information sharing between national governments that wish to maintain significant data security but also wish to share data when necessary to address particular cross-nation issues. As a more specific example, consider a scenario where Interpol has identified a person of interest (POI) who has lived temporarily in multiple countries. Interpol would benefit from obtaining information associated with this POI from each of the databases of each of the identified foreign countries. However, from a security perspective, Interpol may wish to keep the identity of the POI confidential from such countries, and, thus, may wish to query the databases of the foreign countries without revealing the POI's identity (i.e., the content of the query) used to perform the search. On the other hand, the foreign countries may also wish to prevent Interpol from learning information about any other resident from the database, except for information about the POI.

For such a technical problem, a PIR implementation may be used to exchange information between these parties in a way that mitigates their privacy concerns. Using conventional PIR approaches involving exact string matching, Interpol would provide an encrypted query of the POI's name and return all files with only a name exactly equal to the query. In addition to limiting the query to only exact matches, the search scope for conventional PIR approaches may be limited to only pre-extracted fields. In contrast, a regular expression search, according to some example embodiments, may be performed to identify pattern-level matches that may be present anywhere within a stored dataset (e.g., collection of documents) and not limited to pre-extracted fields. According to some example embodiments, a substring matching implementation may operate to return any document with, for example, the POI's name as part of the document, at any location within the document. Moreover, the implementation may be extended to logical combinations of multiple substring matching queries involving the POI. The use of, for example, regular expression queries, via substring matching, provides a basis for an even more powerful version of PIR, according to some example embodiments. Such example implementations may support full-pattern matching algorithms on datasets of text (e.g., documents). As such, according to some example embodiments, any dataset within a database, having any information relevant to, for example, the POI, can be identified as a match to be returned as a query result. When performed within a PIR context, such example embodiments may operate in alignment with cybersecurity and privacy considerations in a variety of applications, including, collaborative national government applications.

According to some example embodiments, PIR implementations described herein employ substring matching implementations and regular expression search implementations by leveraging homomorphic encryption, such as fully homomorphic encryption (FHE) or somewhat homomorphic encryption. Homomorphic encryption is a form of encryption that permits computations and other operations to be performed directly on the encrypted data. As such, some operations may be performed directly on homomorphic encrypted data without the need to decrypt the data, perform the operation, and then re-encrypt the data. Operations that can be performed on the homomorphic encrypted data may include Boolean or arithmetic operations.

A number of different types and variations of homomorphic encryption exist. Partially homomorphic encryption (PHE) is a first type of homomorphic encryption that supports the use of one type of operation an unlimited number of times. Somewhat homomorphic encryption (SHE) is another type of homomorphic encryption that supports the use of two types of operations. Leveled homomorphic encryption (LHE) may support any number of operations, but only for a certain, bounded number of times. Finally, fully homomorphic encryption (FHE) supports a computationally universal set of operations an unlimited (or unbounded) number of times. FHE schemes are the strongest form of homomorphic encryption (HE) for this reason. In some instances, FHE schemes rely on a bootstrapping procedure that converts a SHE scheme into a FHE scheme by resetting the multiplicative depth of a ciphertext.

In combination with implementation of HE, according to some example embodiments, an increase in the efficiency of a PIR protocol can be realized via the implementation of parallel processing or batching. Such efficiency can increase the applicability of PIR solutions that still maintain the privacy of information, but offer more usability since, for example, the processing and time needed to return a query result is useful for many applications.

As such, according to some example embodiments, PIR implementations are described herein allows client devices (e.g., a data requesting computer system) to retrieve data from a database of, for example, a data repository computer, in response to a query, without revealing either the query itself or the matching results that are identified or located via the query. According to some example embodiments, as described herein, HE may be used to implement new PIR protocols that support private matching of queries encoded as regular expressions that is not limited to exact string matching. Example embodiments may be implemented in a manner that allows parties to share specific agreed-upon information in a wide range of formats, without revealing any additional information that may be sensitive, proprietary, or the like. According to some example embodiments, by using, for example, parallel FHE operations, an encrypted query may be performed having a latency on the order of, for example, 10 seconds.

According to some example embodiments, substring search implementations are also described that examine queries against databases using substring comparison while protecting the privacy of both parties. Such substring search implementations may, again, leverage homomorphic encryption to perform searches and obtain private results. In some example substring search implementations, substrings of a database or plurality of datasets may be determined based on, for example, a length of the encrypted query and the determined substrings may be encrypted in preparation for performing the search. A parallelized implementation of such a substring search, according to some example embodiments, can evaluate multiple documents at a time without pre-specifying locations within the documents that are to be searched. Using substrings and regular expressions in conjunction with PIR, as described herein, can realize an implementation that, for example, evaluates encrypted data directly, rather than performing queries and searches against unencrypted, plaintext non-deterministic finite automata (NFAs) or deterministic finite automata (DFAs). According to some example embodiments, an implementation is described, for example, where the input strings or query targets may be plaintext (e.g., regular expressions) and the DFA may be homomorphically encrypted (e.g., fully homomorphically encrypted). In this regard, according to some example embodiments, a homomorphic evaluation of a DFA state transition may be performed by first extracting each of the log(n) individual bits of a binary representation of a next state index using a dot-product between vectors of length n. Subsequently, the binary representation of the next state index may be expanded into a one-hot vector representation. For example, a one-hot vector representation of an integer i may be a vector of length n where all elements are 0 except for the $i^{th}$ index, which is 1. Such an implementation can have a complexity $O(n \log(n))$. As such, according to some example embodiments, an implementation of PIR is described herein that leverages a homomorphic evaluation process for performing a query.

Further with respect to PIR solutions, another example scenario can be described for added comprehension. In this regard, a PIR implementation may allow a user, Alice, to query Bob's database in such a way that her query is encrypted and private, Bob returns all items in his database that match the query, despite not knowing what the query is, and Bob doesn't learn which items he is returning, or even whether the query found a match. In this regard, for a public database, a trivial solution to such a technical problem may be to simply have Bob send the entire database to Alice to sort through, where all details of the sorting are performed without Bob's knowledge. However, the delivery of such a large dataset may be bandwidth and resource intensive. Additionally, the option of sharing an entire database is not available for private databases that have security and privacy requirements that would prevent the recipient from accessing all information in the database.

As mentioned above, some conventional PIR solutions rely on exact string search matching to privately determine whether Alice's query string is contained within a pre-specified location in Bob's text or database, such as in a header or within metadata (e.g., pre-extracted fields). Such an implementation can determine whether or not Alice's query string exactly matches with a string in a pre-extracted field. Such an exact string search matching may be an improvement over the trivial solution of sending the entire database, but such an implementation is still rigid and computationally complex thereby limiting its usefulness. According to some example embodiments, more flexible and less computationally expensive PIR solutions are described that can handle substantially more complex queries.

In this regard, various example embodiments leverage the abilities of homomorphic encryption (HE) to implement an improved PIR solution. As described above, HE supports an ability to perform computations on encrypted data without first decrypting the data or requiring knowledge of a secret key. In this regard, computations may be performed directly on the homomorphically encrypted data to produce a result, which can be subsequently decrypted by, for example, a private key holder. According to some example embodiments, the decrypted result may be identical to what the result would have been had the computations been performed on decrypted data directly. According to some example embodiments, fully homomorphic encryption (FHE) and somewhat homomorphic encryption (SHE) may be utilized to create a flexible and privacy-preserving PIR implementation.

FIG. 1 shows an example system 100 in which such private queries, according to some example embodiments, may be performed and results returned. In this regard, the entities involved may be a data requestor 110, possibly in the form of a data requesting computer or computer system, and a data repository 120, which may be embodied as a data repository computer or computer system. The data repository 120 may be comprised of a query executor 130, possibly implemented on a computer system that is configured to execute a query as provided by the data requestor 110, such as the data repository 120. A query 160 may be provided having query content (e.g., a query string) to use for matching in the search. The data repository 120 may also include a database 140, which may be, for example, a collection of datasets or data records (e.g., documents) that are stored, for example, on memory devices of servers at a physical location with the query executor 130 or at another location (e.g., in the cloud).

The data requestor 110 may submit a query 160, via a network such as a public network (e.g., the Internet), to the data repository 120 for execution and the query executor 130 may search the database 140 based on the query 160. In this regard, the data requestor 110 may be specially configured to generate a query 160 according to various example embodiments. In this regard, the query 160 may homomorphic encrypted. The query executor 130 may be specifically configured to interpret the query 160 and perform a search and retrieval of data while being unable to decipher the content of the query or the results of the query. In this regard, the datasets that are searched against may, but need not, be homomorphically encrypted to permit the search operations to be performed in the encrypted domain directly on this encrypted data. In some example embodiments, the encrypted query may be applied to unencrypted datasets to perform the search. Upon completing the search, the results 170 of the search (e.g., in the form of resultant encrypted datasets) may be returned to the data requestor 110. Communications connectivity between the data requestor 110 and the data repository 120 may be via a network. As such, in instances where the connection between the data requestor 110 and the data repository 120 is public or otherwise accessible to third parties, one or more covert monitors 150 may be present that monitor or sniff the network for information, such as, for example, query 160 or results 170 to extract information. Additionally or alternatively, covert monitors 150 may monitor or sniff information exchanged within the network or domain of the data repository 120, or even between the query executor 130 and the database 140, which, according to some example embodiments, may be remote from each other and may communicate via, for example, a public network such as the Internet.

With this context as a back drop, it can be seen that submitting a query with content of, for example, a plaintext string, such as characters, on a public network or to an untrusted data repository 120 may compromise the search privacy if conventional non-private techniques were utilized. Such non-private techniques may allow the interests and motivations of the data requestor 110 to be revealed. As such PIR techniques, as described herein, may provide solutions to this technical problem.

According to some example embodiments, the PIR implementations described herein leverage both encryption and efficiency to increase the usability of PIR solutions in a wider variety of applications. According to some example embodiments, the PIR implementations may allow a data requestor 110 to search a data repository 120 without revealing the data requestor's 110 search criteria, without sacrificing bandwidth, and without having to deploy a trusted device in data repository's 120 domain. Further, with respect to bandwidth, such private queries can be performed without having to, for example, transfer, download, and duplicate the entirety of the data of the data repository 120 to a trusted domain in an effort to maintain the privacy of the query and the results. As further described herein, such private queries may, according to some example embodiments, be performed by using arbitrary length strings, which may be more flexible than conventional fixed string length implementations.

Accordingly, it is clear that there is an increasing need to retrieve targeted data from untrusted databases in a private manner. Using conventional non-private techniques, organizations in domains such as, for example, defense, research, and healthcare may hesitate to submit queries to open or untrusted data repositories (e.g., data repository 120), because the queries themselves could reveal sensitive information. As an example, the data requestor 110 may fear that querying for specific security indicators in data repository 120's operational network may leak knowledge of data requestor's 110 indicators to covert monitor 150, who may be an adversary that covertly monitors data repository's 120 network. As a result, for example, covert monitor 150 may be informed of ways to avoid detection by data requestor 110 while also continuing to be concealed from data repository 120.

According to some example embodiments, the PIR implementations as described herein may provide data requestor 110 with a way to perform private queries while also minimizing the use of bandwidth, storage, and processing resources. Additionally, according to some example embodiments, the private query implementations may also perform in a highly efficient manner due to, for example, being able to perform the queries with the query and, in some instances, the database still encrypted, to thereby avoid the operational costs associated with decrypting and re-encrypting information to perform the search. Such implementations may also protect data requestor 110's query information while limiting data requestor 110's access to the data in the database 140 to only that which meets the query requirements. As mentioned above, the use of homomorphic encryption may produce precise results for data requestor 110 that are hidden from data repository 120 (and covert monitors 150).

The example systems and techniques described herein may be applied in a number of settings. For example, such systems and techniques may be leveraged to maintain query privacy while searching streaming data sets in applications such as searching infected domains for sensitive malware indicators, searching financial transaction streams for illegal activity, and searching partner networks for covert communications without revealing information to any resident adversaries.

According to various example embodiments, such improved PIR implementations described herein may employ a substring search technique or a regular expression search technique. Example embodiments of various implementations of an improved PIR using substring search will be described, followed by descriptions of implementations of an improved PIR using regular expression search.

Figure 2:
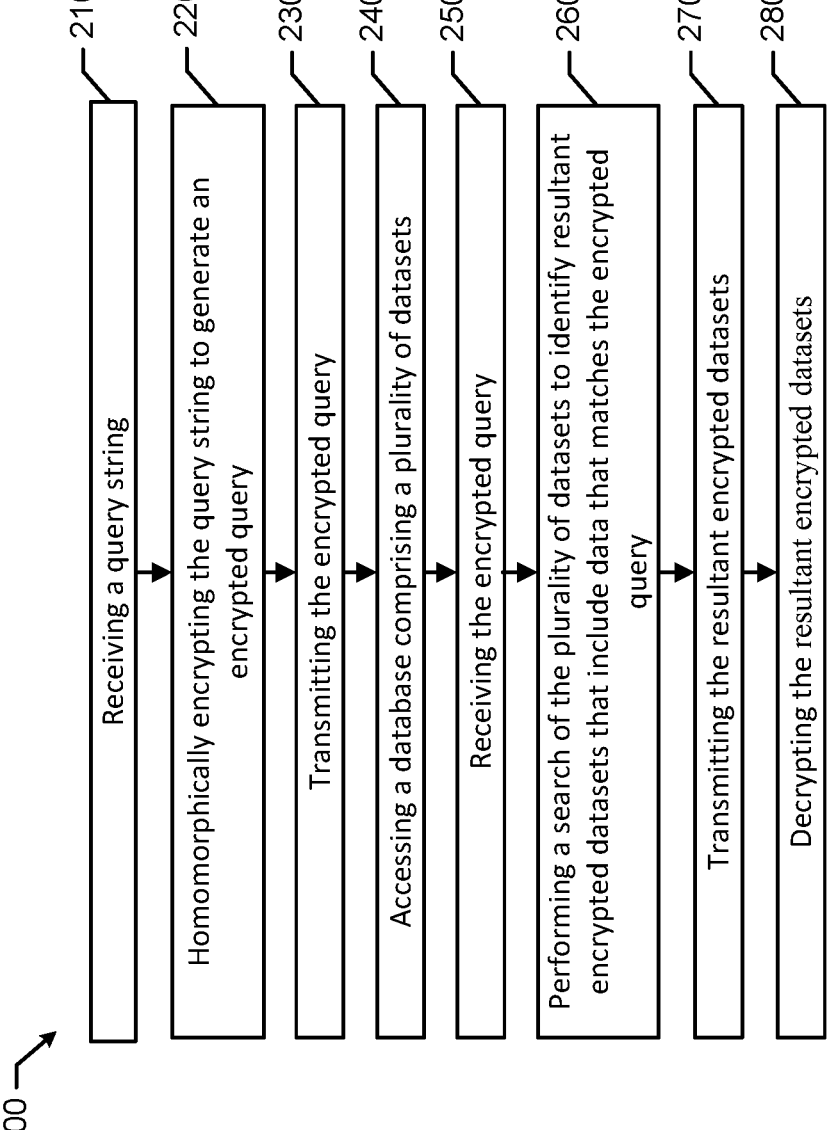
FIG. 2 illustrates an example flowchart for performing a private information retrieval according to an example embodiment.

According to some example embodiments, an example method for performing a PIR search is illustrated by the flowchart 200 of FIG. 2, which may be implemented in accordance with either a substring search or a regular expression search. In this regard, at 210, the example method may comprise receiving a query string. The query string may be received at, for example, a data requesting computer such as the data requestor 110. At 220, the example method may comprise homomorphically encrypting the query string to generate an encrypted query, and, at 230, transmitting the encrypted query, for example, to a data repository computer, such as, for example, the data repository 120. Further, at 240, the example method may comprise accessing a database (e.g., database 140) comprising a plurality of datasets. Such datasets, according to some example embodiments, may be encrypted datasets that are homomorphically encrypted. The example method may further comprise, at 250, receiving the encrypted query, for example, at the data repository 120, and, at 260, performing a search of the plurality of datasets to identify resultant encrypted datasets that include data that matches the encrypted query. In this regard, according to some example embodiments, performing the search may comprise maintaining encryption of the encrypted query while performing computational operations of the search. In some instances, the search may be performed against unencrypted or encrypted datasets. Moreover, the resultant encrypted datasets may also be homomorphically encrypted. Subsequently, the example method may comprise, at 270, transmitting the resultant encrypted datasets, for example, to the data requesting computer (e.g., data requestor 110), and, at 280, decrypting the resultant encrypted datasets at the data repository computer (e.g., data requestor 110).

In consideration of the example method of FIG. 2, a description of some example embodiments of a substring search within the context of the example method will now be described. A substring search, according to some example embodiments, may be performed in an encrypted environment that leverages HE, and, more specifically, SHE-based protocols. In a substring search, according to some example embodiments, a goal is to privately determine whether, for example, Alice's string is contained anywhere within Bob's database. This criterion may be used to determine whether to return a document from Bob's database to Alice within a broader PIR protocol.

To determine whether a query string (e.g., Alice's query) is contained anywhere within a plurality of datasets of a database (e.g., Bob's database), the query string may be hashed, and all possible substrings that are the length (or size) of the query string in the plurality of datasets (e.g. documents) of the database may also be extracted and hashed. Subsequently, a homomorphic check may be performed to determine whether query string has a non-empty intersection with the database hashes, which may be indicative of a match.

As such, a substring search implementation may, according to some example embodiments, involve determining homomorphically whether the hash of a query string matches any of the substring hashes from the database or repository. Such a matching process may be performed using, in according to some example embodiments, Fermat's Little Theorem (FLT). FLT may be used as an equality check in modular arithmetic that is amenable to homomorphic computation. An example embodiment of such a modular equality check is provided in Algorithm 1 below.

---

Algorithm 1 Modular Equality Check

Input
     a := number
     q := prime modulus
Output $$\begin{cases} 0 & \text{if } a \equiv 0 \ (\text{mod } q) \\ 1 & \text{if } a \not\equiv 0 \ (\text{mod } q) \end{cases}$$

Procedure        ▷ compute $a^{q-1}$ (mod q)
1: b ← 1
2: for i < $\log_2$ q do     ▷ Binary expansion of q − 1
3:    if (q − 1) (mod $2^{i+1}$) ≥ $2^i$ then
4:      b ← b · a (mod q)
5:    end if
6:    a ← a · a (mod q)
7: end for
8: return b      ▷ By FLT b = 0 or b = 1

---

The example modular equality check may be based on the FLT identity $$a^{q-1} \equiv 1 \ \text{mod} \, q,$$

which holds for all integers a for a prime modulus q. Accordingly, Algorithm 1 may combine this theorem (i.e., the FLT identity) with an efficient modular exponentiation routine based on repeated squaring to homomorphically compute and determine whether a mod q≡0 using O(log q) multiplications. Due to the use of SHE, according to some example embodiments, the levels required (or depth) in performing the modular exponentiation may be pre-determined based on a plaintext modulus. In this regard, for example, for the example modulus of 786433, the multiplicative depth of Algorithm 1 is 19.

Following from the above, an example embodiment of a substring search method is provided in the flowchart 300 of FIG. 3. In this regard, at 310, the example method may comprise encrypting a query string using homomorphic encryption. In this regard, the query string may be encrypted using, for example, somewhat homomorphic encryption (SHE). Subsequently, the homomorphic encrypted query string may be hashed at 320. At 330, all possible strings (or substrings) having the same length (size) as the query string may be extracted from a database of a data repository. Such substrings may be extracted and then encrypted and hashed. However, in some example embodiments, the database may already be encrypted and the substring may be extracted already in an encrypted form. Thus, according to some example embodiments, the substrings may then be encrypted and hashed at 340.

Accordingly, at 350, the hashed and homomorphically encrypted query string may be subtracted from each of the hashed and homomorphically encrypted extracted strings from the database to generate a raw results vector of encrypted zero (matched) and nonzero (unmatched) values. The vector may be evaluated, at 360, to determine positions of zero and nonzero values within the vector. A zero value may correspond to a match and a nonzero may correspond to a non-match or mismatch. Accordingly, an example embodiment of Algorithm 1 may then be applied. In other words, at 370, the vector may be transformed by having each encrypted value a in the vector replaced by $a^{q-1}$ mod q, using the FLT identity. Thus, by the FLT identity, each nonzero value may become a 1, and each zero value may be unchanged (i.e., remain a zero value).

Thereafter, according to some example embodiments, the transformed vector may be homomorphically subtracted from a vector of ones to obtain a binary indicator vector. The binary indicator vector may have a length that is equal to the number of substrings. Additionally, the binary indicator vector may have a 1 at positions where a substring for that position matches the query string. As such, according to some example embodiments, the positions of matches to the substrings of the database may be determined based on an evaluation of the binary indicator vector.

According to some example embodiments, a spreading operation or process may be performed on the binary indicator vector at 380. In this regard, any 1 (or 1-bit) in the binary indicator vector may be spread to generate a results vector, where the results vector is a vector of ones, if there is any substring match or a vector of zeros, if there is no substring match. At 390, the homomorphically encrypted database may be multiplied by the results vector to determine and return the matching results in the form of resultant encrypted datasets. In this regard, any substring match may result in, for example, an entire dataset, such as, for example, an entire document, that includes the substring to be returned as an encrypted query result.

Referring back to the implementation of a spreading process, in order to spread a 1 or 1-bit in the binary indicator vector through or across the entire binary indicator vector, according to some example embodiments, a "spread-or" operation may be performed. The spread-or operation or function may generate a rotated vector from an original vector and then use the OR-gate operation to combine the original vector with the rotated vector. The application of the spread-or operation may be repeated until each value in the binary indicator vector has been OR-gated with a new value. As such, a single value (e.g., a single 1) may be spread to all values in the vector for that a particular document. In the event that the binary indicator vector for a document includes a 1, indicating that the document has a substring match, the spread-or operation can spread the 1 into all positions in the binary indicator vector to indicate that the document should be returned as having matched information.

Following from the description above, a homomorphically-compatible or-operation is presented by the truth table in Table 1 provided below. In this regard, Table 1 illustrates a truth table for an or-gate, computed using integer arithmetic. As such, as the spread-or operation is applied to perform one multiplication per iteration, the multiplicative depth of the entire spread-or subroutine is equal to $\log_2$ (doc_size), where doc_size is the size of the corresponding document.

TABLE 1

| x | y | $x + y - x \cdot y$ |
|---|---|---|
| 0 | 0 | 0 |
| 0 | 1 | 1 |
| 1 | 0 | 1 |
| 1 | 1 | 1 |

According to some example embodiments, the substring search may be implemented using a parallel processing technique. In this regard, a parallelized version of substring search may leverage an interleaved data format, which may be compatible with the homomorphic spread-or operation. In this regard, the spread-or operation may be computed similar to the non-interleaved operation, but the non-interleaved operation may stop before spreading values to indices corresponding, for example, to different documents. As a result, rather than spreading a select value to every position in the vector (e.g., the binary indicator vector), the value may be spread only to the entries corresponding to each individual document, thereby avoiding impact on the values at positions corresponding to other documents.

Such an interleaved data format can allow for multiple documents to be processed as a single vector of information. Doing so effectively parallelizes the operations because each document can be then be processed simultaneously via the interleaved vector of information. Accordingly, quicker evaluation of large sets of data may be realized. The multiplicative depth requirement of the algorithm may depend on p (for the modular equality check subroutine) as well as on the doc_size (for the spread-or subroutine). However, the depth requirement need not depend on the parallel number of documents.

In this regard, the inputs and outputs of the parallelized substring search algorithm, according to some example embodiments, are given in Algorithm 2 (referencing the Alice and Bob scenario) as provided below, with an overview of the procedure. The output, according to some example embodiments, may be a vector including the documents from the target database that have at least one match with the substring, and the remainder of the vector entries or positions will be zero. Additionally, the parallelized process may also be generalized to account for documents of different lengths by utilizing, for example, padding. Padding may involve expanding the document via, for example, the addition of white or blank space, such that some portion or all of the documents have the same length.

---

Algorithm 2 Parallel Substring Search

---

Input
string_size := length of query
        p := plaintext modulus
    doc_size := length of each document (power of two)
num_docs := number of documents (power of two)
    levels := multiplicative depth,
            depends on doc.size and p
Output $\begin{cases} 0 & \text{if no matches exist} \\ \text{Bob's document(s)} & \text{if at least once match exists} \end{cases}$ 1: Begin Alice Section
2: batch_size = doc_size * num_docs -continued Algorithm 2 Parallel Substring Search

```
3: key_pub, key_sec, key_eval
        = KeyGen(batch_size, p. levels)
4: hq ← hash(query)
5: hq_vec ← [hq, hq, . . . , hq]   ⊳ length = batch_size
6: en_vec ← encrypt(key_pub. hq-vec)
7: Begin Bob Section
8: sub_hashes ← [0, 0, . . . , 0]   ⊳ length = batch_size
9: for n ≤ num_docs − 1 do
10:    doc = documents[n]
11:    for i ≤ doc.size − string_size − 1 do:
12:        substring ← doc[i : i + string_size
13:        sub_hashes[i − num_docs + n] ←
14:            hash(substring)
15:    end for
16: end for
17: en_hash ← encrypt(key_pub_sub_hashes)
18: results ← en_hashes − en_vec
19: results ← 1 − FLT(results)
20: for log₂ (num_docs) ≤ i ≤ log₂
            (num_docs · doc_size) − 1 do:
        ⊳ spread-or subroutine
21:    X ← results >> 2ⁱ   ⊳ ciphertext rotation
22:    results ← X + results − X · results
23: end for
24: char.results ← {0, 0, . . . , 0} ⊳ length = batch_size
25: for n ≤ num_docs − 1 do
26:    doc = documents[n]
27:    for i ≤ doc_size do:
28:        char_results[i · num_docs + n] ← doc[i]
29:    end for
30: end for
31: return results · char_results
32: Begin Alice Section
33: dec_results ← decrypt(key_sec.results)
```

Initially, with respect to substring search implementations, some more specific example embodiments may leverage a PALISADE homomorphic encryption software library that leverages a Brakerski-Gentry-Vaikuntanathan (BGV) encryption scheme. Such an implementation may be considered when describing the more fundamental aspects of a substring search implementation. In this regard, the PALISADE homomorphic encryption software library, as described at https://palisade-crypto.org and incorporated by reference herein in its entirety, may be utilized as an implementation of a BGV encryption scheme, as described in "Accelerating BGV scheme of fully homomorphic encryption using GPU's" J. Dong, Ph.D. dissertation, Worcester Polytechnic Institute, 2016 incorporated by reference herein in its entirety, to facilitate a substring search PIR protocol. BGV is a well-known FHE scheme that is capable of evaluating arbitrary polynomial-size computations represented as circuits (e.g., Boolean or arithmetic circuits). Security characteristics of BGV are based on a hardness of the learning with error (LWE) and ring-LWE problems known to one of skill in the art. BGV can function as a leveled or bootstrapped encryption scheme and operate with PALISADE, which is an open-source project that provides efficient implementations of various HE schemes, including BGV.

In a more specific example embodiment, a substring search implementation may be implemented, for example, in the Python programming platform with C++ bindings using the PALISADE library (version 1.11.5) implementation of a BGV residue number system (rns). The example embodiment employed an AMD (Advanced Micro Devices) EPYC 7742 2.25 GHZ Central Processing Unit with eight cores. The encryption parameters for the example embodiment were set to p=786433, N=2¹⁶, and a multiplicative depth of 36 was set, which may be sufficient for 128-bit security. According to some example embodiments, the multiplicative depth parameter may be selected based on the requirements of Algorithm 2 provided above. An FLT subroutine, with p=786433, may consume 19 levels, and the spread-or operation may take $\log_2$ (doc_size) levels, which may vary in this example, from 7 to 15. Including other multiplications that are implemented as part of the search, the total required multiplicative depth for such an example embodiment may vary from 27 to 35 for the document sizes provided in Table 2, below. In this regard, Table 2 provides a listing of example document sizes (doc_size) and numbers of documents (num_docs) where each row is the same with respect to total data quantity (i.e., doc_size×num_docs). With that in mind, the differences in runtime for the homomorphic component of Algorithm 2 (in seconds) is provided in the third column.

TABLE 2

| doc_size | num_docs | matching time (s) |
| --- | --- | --- |
| 128 | 256 | 10.3 |
| 256 | 128 | 10.5 |
| 512 | 64 | 10.4 |
| 1024 | 32 | 10.9 |
| 2048 | 16 | 11.1 |
| 4096 | 8 | 11.1 |
| 8192 | 4 | 11.2 |
| 16384 | 2 | 11.3 |
| 32768 | 1 | 11.4 |

As such, a fixed multiplicative depth of 36 may be used in this example embodiment for the various document sizes and numbers of documents provided in Table 2. In this regard, according to some example embodiments, the multiplicative depth could be determined or selected in an adaptive manner based on the PIR parameters to optimize search runtimes for certain document sizes and document quantities.

Further, in this specific example embodiment, a fixed batch size of 32768 was used and the number of documents and document lengths were varied accordingly based on the content of Table 2. For this example embodiment, the hash function SHA-256 (Secure Hash Function-256) was used, having an output modulo p. The hash-collision rate (which can determine the false-positive rate for the PIR protocol) may be approximately (1/p). Again, as shown in Table 2, the matching time can be around 10 seconds for all parameter settings, which indicates that this example embodiment of the substring search implementation is useful and efficient for exchanging information. Moreover, as indicated by the small deviations between the runtimes in Table 2, modifications to the PIR parameters have a relatively small impact on runtime.

Based on the foregoing, another example embodiment of method of performing a substring search, according to some example embodiments, is provided as shown in the flowchart 400 of FIG. 4. In this regard, the example method may comprise, at 410, hashing the encrypted query to generate a hashed encrypted query, and, at 420, extracting a plurality of encrypted or unencrypted substrings from the plurality of datasets. In this regard, the plurality of substrings may be extracted such that each substring has a same length as the encrypted query. At 430, the example method may comprise hashing and, if needed, encrypting each of the substrings to generate a plurality of hashed encrypted substrings. At 440, the method may include homomorphically subtracting the hashed encrypted query with each of the hashed encrypted substrings to identify matching substrings for use in determining the resultant encrypted data sets. Additionally, at 450, the example method may comprise generating a raw results vector for each encrypted dataset, and, at 460, transforming each raw results vector with a match into a binary indicator vector having a true binary value at a position associated with a matched substring of the encrypted dataset and a false binary value at a position associated with an unmatched substring of the encrypted dataset. In this regard, the false binary values may be generated by converting unmatched values resulting from the homomorphic subtraction to the false binary value. According to some example embodiments, the raw results vector may be transformed into a binary indicator vector having interleaved values to support parallel homomorphic subtractions with result values being populated into the binary indicator vector using interleaving. Further, at 470, the example method may comprise, for each binary indicator vector, perform a spreading operation to spread the true binary value to positions within binary indicator vectors having a true binary value to remove position-based matching information from the binary indicator vector and also identify the resultant encrypted datasets. In any event, a result vector may be generated at 480.

Having described various example embodiments of substring search implementations, a description of some example embodiments of regular expression search implementations will now be described. In this regard, implementations of regular expression search differ from substring search implementations, but, according to some example embodiments, combinations of the regular expression and substring search implementations can be performed in accordance with further example embodiments.

As further described below with respect to some more specific example embodiment implementations, in this regard, some implementations of example embodiments of regular expression search, in the PIR context, may leverage a NuFHE implementation of the torus fully homomorphic encryption (TFHE) encryption scheme, as described in "NuFHE, a GPU-powered torus FHE implementation" at https://nufhe.readthedocs.io/en/latest and incorporated herein by reference in its entirety. TFHE is a type of FHE scheme that supports fast single-bit operations and utilizes bootstrapping after every computation (or gate). Additionally, NuFHE includes single-instruction-multiple-data capabilities. Together, TFHE and NuFHE, as further described below, may be used in an example regular expression search implementation.

According to some example embodiments, on a more general level, a private regular expression search may be implemented that, similar to substring search, leverages HE. According to some example embodiments, regular expression search may be implemented using an FHE-based protocol. A regular expression, as used herein, may be an expression that has, for example, a natural language pattern. In short, some example embodiments operate to determine whether any of the items (e.g., documents, datasets, etc.) in a target database (e.g., Bob's database) match the natural language pattern that is provided in a query string (e.g., Alice's query). According to some example embodiments, the query string that is a natural language pattern may be converted to be represented as a deterministic finite automaton (DFA).

According to some example embodiments, the query state machine may be built on features of a Deterministic Finite Automaton (DFA) D. A DFA may be structure in the form of a finite-state machine that may accept or reject strings of symbols. In this regard, a DFA D may be expressed as $D=<T, \Sigma, \delta, t_0, F>$, where T is a finite set of states, $\Sigma$ is a set of input symbols (e.g., a target query string), $\delta: T \times \Sigma \rightarrow T$ is the transition function which returns a new state based on a current state and a next observed symbol from the set of input symbols, $t_0 \in T$ is the initial state, and $F \subseteq T$ are accepting states. In this regard, a DFA may be executed by processing input symbols of an input string (e.g., a target query string from a selected record) one at a time and updating the current state (or cursor) using the transition function $\delta$. According to some example embodiments, a DFA may accept a given input string, according to some example embodiments, if and only if the computation of the given input string terminates at an accepting state.

A DFA, with additional privacy features, may be one example of a query state machine that may be used in accordance with some example embodiments. As a DFA, the regular expression may be compiled into the form of a finite state machine that can be utilized to accept or reject a given string by transitioning through the unique sequence of states that are representative of the regular expression. According to some example embodiments, the DFA may be transformed or processed into the form of a query table. Such a query table may be encrypted, and then subsequently homomorphically evaluated against an unencrypted database, according to some example embodiments, to find matches for the regular expression query sting in the form of a DFA.

Having broadly described some example embodiments of regular expression search implementations, a description of some example implementations for compiling the regular expression into a DFA will now be described. A variety of example techniques may be used to compile the regular expression into a DFA. According to some example embodiments, the regular expression may be first processed or compiled into a nondeterministic finite automaton (NFA), and the NFA may be then compiled into a DFA. However, according to some example embodiments, a regular expression derivative technique or another technique may be, for example, implemented directly on the regular expression to generate a DFA that may possibly be smaller and more efficient. In this regard, according to some example embodiments, a regex derivative algorithm such as one described in J. A. Brozowski et. al, "Derivative of regular expressions," Journal of Functional Programming, vol. 19, no. 2, propulsion platform. 173-190, 2009, hereby incorporated by reference in its entirety, may be used to generate a DFA for a regular expression search.

Accordingly, a target database or dataset (e.g., Bob's dataset) may be homomorphically evaluated against a query DFA (e.g., Alice's DFA) in a variety of ways according to some example embodiments. For example, to perform the homomorphic evaluation, a bitwise representation of the query DFA may be used. According to some example embodiments, a Single-Instruction-Multiple-Data (SIMD) technique for the regular expression search may be used. In this way, a change from integer indices to a bitwise representation of the indices may result which introduces complexity to the encoding and encrypting of the query DFA and the encoding of the current state.

Figure 5:
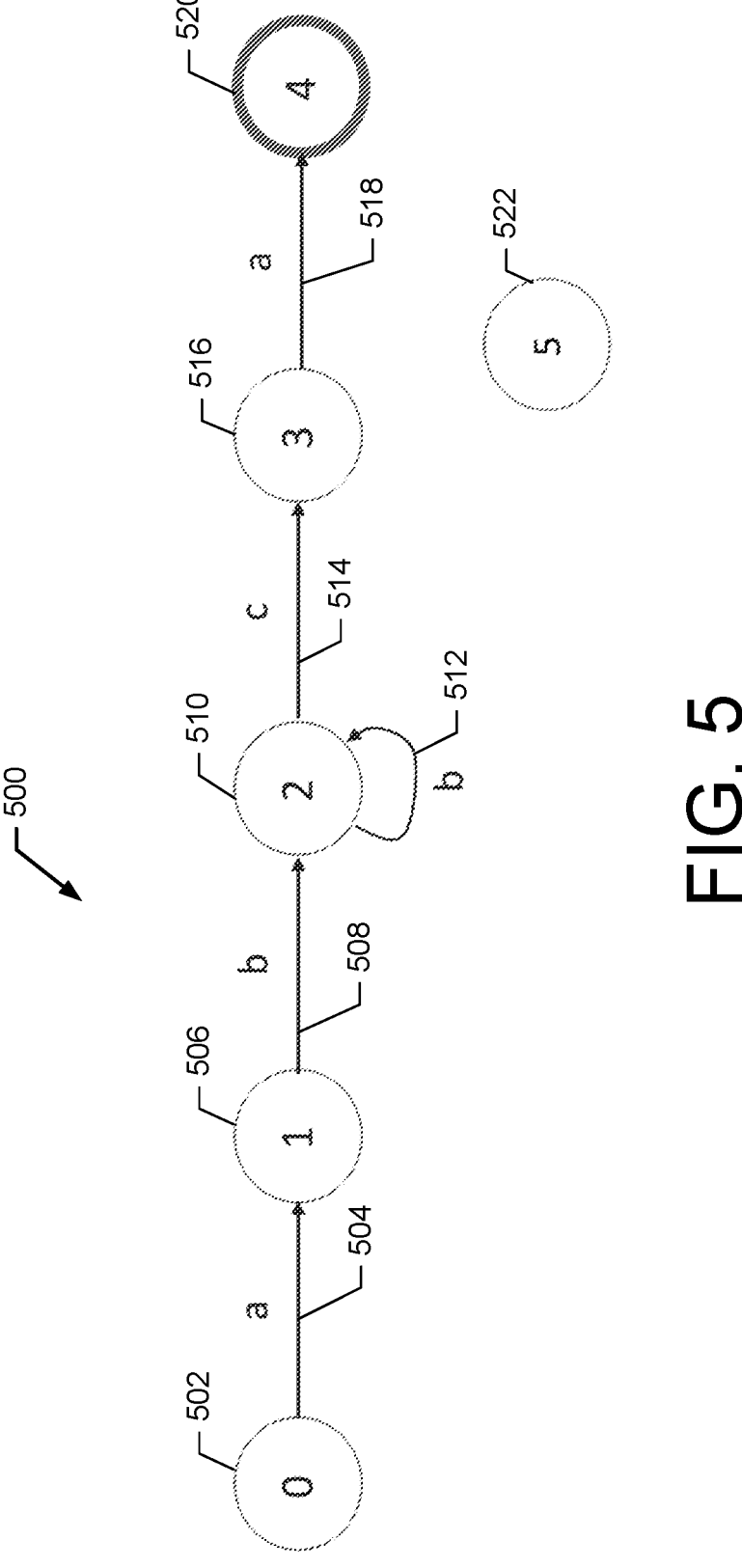
FIG. 5 illustrates state diagram of a query deterministic finite automaton (DFA) according to an example embodiment.

An example process for generating an encrypted bitwise representation of the query DFA will now be described. In this regard, an example query DFA over the alphabet {a, b, c, d} may be provided as follows. The particular example query DFA accepts strings that begin with a followed by one or more occurrences of b, and end with ca. This relationship, which may be based on a regular expression, may be written as ab+ca, and the query DFA for this relationship is provided in FIG. 5. In this regard, the query DFA 500 as a search query for a regular expression may include a starting state 0 at 502 and a final or accepting state 4 at 520. In operation, character and position matching may be performed by moving through a string of characters and considering character queries at 504, 508, 512, 514, and 518. Based on these character queries, a search query may move through the states 0 at 502, 1 at 506, 2 at 510, 3 at 516, and 4 at 520 based on the outcomes of the character queries. The fail state, which is the state that the process moves to when a character query is false or fails, is state 5 at 522.

According to some example embodiments, a query DFA may also represented as an integer state table. Here, Table 3 is an integer state table representation of the query DFA 500, and Table 3 is provided below for the characters a, b, c, and d.

TABLE 3

| Inputs | States | | | | | |
| | 0 | 1 | 2 | 3 | 4 | 5 |
| --- | --- | --- | --- | --- | --- | --- |
| a | 1 | 5 | 5 | 4 | 5 | 5 |
| b | 5 | 2 | 2 | 5 | 5 | 5 |
| c | 5 | 5 | 3 | 5 | 5 | 5 |
| d | 5 | 5 | 5 | 5 | 5 | 5 |

The integer state table may then, according to some example embodiments, be converted into a bitwise state table representation and the bitwise state table representation may be encrypted using, for example, FHE. According to some example embodiments, the row and column headers need not be changed or encrypted because, for example, the alphabet is public. However, the number of columns may reveal the number of states in the DFA. As such, according to some example embodiments, to disguise a number of states of the DFA, some number of dummy states may be added with the dummy states being fail states.

The bitwise state table representation may, according to some example embodiments, require the use of multiple parallel tables, with each table storing one bit of the state. The DFA 500 has six states, and therefore the DFA 500 may be represented by $\lceil \log_2(6) \rceil = 3$ encrypted bit tables. In this regard, one bit table may be generated for each of the bits in the binary representation of the state indices. Due to the use of FHE, the encrypted bit tables may have the same dimensions as the original encrypted DFA state table. An example of a high-order encrypted bit table, based on the content of Table 3, is shown in Table 4 below.

TABLE 4

| Inputs | 0 | 1 | 2 | 3 | 4 | 5 |
| --- | --- | --- | --- | --- | --- | --- |
| a | E(0) | E(1) | E(1) | E(1) | E(1) | E(1) |
| b | E(1) | E(0) | E(0) | E(1) | E(1) | E(1) |
| c | E(1) | E(1) | E(0) | E(1) | E(1) | E(1) |
| d | E(1) | E(1) | E(1) | E(1) | E(1) | E(1) |

In order to convert between the bitwise representation and the integer representation, a table of the encrypted binary representation for each possible state index is also needed. For our six-state example, a 3×6 table of encrypted bits may be generated, as shown in Table 5. Note that Table 5 as an encrypted bitwise table does not contain any information about the query DFA 500 other than the public number of states (e.g., one for each letter of the alphabet).

TABLE 5

| Bits | States | | | | | |
| | 0 | 1 | 2 | 3 | 4 | 5 |
| --- | --- | --- | --- | --- | --- | --- |
| 0 | E(0) | E(0) | E(0) | E(0) | E(1) | E(1) |
| 1 | E(0) | E(0) | E(1) | E(1) | E(0) | E(0) |
| 2 | E(0) | E(1) | E(0) | E(1) | E(0) | E(1) |

According to some example embodiments, the encrypted bitwise representation of the query DFA may preclude the use of some homomorphic equality checks (such as, for example, those used in the integer-based Algorithm 1) to determine a next state when evaluating the encrypted query DFA with respect to input data from, for example, a target database. According to some example embodiments, however, a process may be formulated that leverages a combination of two subroutines such as, for example, creating a one-hot vector to represent a next state, and utilizing a dot product. Such subroutines may be implemented for bitwise inputs and computed using SIMD, for example, for efficiency.

In this regard, to determine a next state in our bitwise representation, a dot product may be performed between the one-hot vector we create and the binary DFA tables. This dot product may operate to isolate a relevant entry from each DFA table. To create the one-hot vector representation, the bitwise representation of the state may be converted into the one-hot vector encoding of an index of that state. Moreover, according to some example embodiments, a one-hot vector function may be based on an equality test for pairs of encrypted bit vectors. Such an equality test may be constructed for encrypted bit vectors. Initially, it is noted that the NXOR logic gate may be used to implement equality checking of two individual input bits. In other words, for the truth table of Table 6, a 1 (or true) results if and only if the two individual input bits are equal (i.e., both zeros or both ones).

TABLE 6

| p | q | $\neg p \oplus q$ |
| --- | --- | --- |
| 0 | 0 | 1 |
| 0 | 1 | 0 |
| 1 | 0 | 0 |
| 1 | 1 | 1 |

Further, according to some example embodiments, an example truth table, such as the truth table of Table 6, may be combined this with the conjunction (i.e., an AND gate) operator A to yield a subroutine that returns 1 if and only if the lists of inputs are element-wise equal as indicated by the following expression for binary equality.

$$\text{binary\_equality}(x_0, x_1, x_2; y_0, y_1, y_2) =$$
$$NXOR(x_0, y_0) \wedge NXOR(x_1, y_1) \wedge NXOR(x_2, y_2)$$

In addition to the above description of some example embodiments of a PIR regular expression search, the following provides a more streamlined description of an example method. In this regard, to generate the encrypted next state, a homomorphic equality test of the current state may be performed with each of the column vectors in the encrypted states table, which may produce an encrypted one-hot-vector. Subsequently, the dot product of the one-hot-vector may be homomorphically calculated with the current character row of each of the bit tables, which generates the bits of the next state. Accordingly, this method may be repeated until all input characters have been processed.

According to some example embodiments, the method may continue to conclusion determining whether the encrypted final state is contained in the set of encrypted DFA accepting states. In this regard, HE may not support a direct test of set inclusion. As such, in the encrypted query DFA, the accepting states may be represented by an encrypted bit vector such as, for example, dfa_accepting_states, having lengths equal to the number of query DFA states. In this regard, the $i^{th}$ entry of the vector is E(1) if state i is an accepting state, and is E(0) otherwise.

According to some example embodiments, a one-hot vector may then be created by comparing the final state with each column vector of encrypted bitwise states tables. Such an implementation is also leveraged when calculating the next state at each step of the procedure. Subsequently, the encrypted dot product of this one-hot vector may be calculated with the dfa_accepting_states, which may return E(1) if the final state is an accepting state, and E(0) otherwise.

According to some example embodiments, a bitwise implementation for creating one-hot vector and performing a dot product is summarized in Algorithm 3 and Algorithm 4, respectively. Algorithm 3 and Algorithm 4 may have similar structures as shown below. In this regard, both algorithms comprise, for example, element-wise operations over an entire matrix with zero padding. The algorithms may then be operable to perform recursive fold reductions over a particular axis after padding a dimension to an appropriate power-of-two length. According to some example embodiments, such a map-reduce-fold structure may allow for efficient parallel implementation, for example, on platforms that support SIMD parallelism.

---

Algorithm 3 One Hot Vector

```
       Input
curr_state := binary representation of the current state
bi_rep_table := binary representation of all integers up
               to number of states, in a 2-D table
       Output
one_hot := vector of zeros with 1 in ith entry, where
           i is the integer corresponding to the imput bits
       Procedure
  1:     curr_state ← broadcast(curr_state, shape(bi_rep_table),
         axis = 1) ▷ broadcast elements of curr_state to 2-D
         shape of bi_rep_table
  2:     one_hot ← XNOR(curr_state, bi_rep_table))
  3:     r ← shape(one_hot)[2]
  4:     if r not a power of two then
  5:       r ← 2^{⌈log2 r⌉}
  6:       one_hot ← pad(one_hot, value = 1, length =
           r, axis = 2) ▷ pads the shape to the desired length
           along the second axis, filling the value
  7:     end if
  8:     while r > 1 do
  9:       r ← r/2
 10:       x ← one_hot[: r,:]
 11:       y ← one_hot[r :,:]
 12:       one_hot ← AND(x, y)
 13:     end while
 14:     return one_hot
```

---

Algorithm 4 Dot Product

```
       Input
dfa_bit_tables := dfa tables for each bit
    one_hot :=one hot vector
       Output
state_bits := list of bits corresponding to new state index
       Procedure
  1:     one_hot ← broadcast(one_hot, shape(dfa_buit_tables),
         axis = 2) ▷ broadcast elements of one_hot to 2-D
         shape of dfa_bit_tables
  2:     result ← AND(dfa_bit_tables, one_hot)
  3:     r ← shape(result)[1]
  4:     if r not a power of two then
  5:       r ← 2^{⌈log2 r⌉}
  6:       one_hot ← pad(one_hot, value = 0, length =
           r,axis =1) ▷ pads the shape to the desired length
           along the first axis, filling the value
  7:     end if
  8:     while r > 1 do
  9:       r ← r/2
 10:       x ← result[: r,:]
 11:       y ← result[r :,:]
 12:       result ← OR(x, y)
 13:     end while
 14:     return result
```

---

According to some example embodiments, a regular expression search method that incorporates both Algorithm 3 and Algorithm 4 is shown in Algorithm 5. Such a method may be generalized, for example, to account for documents having different lengths by utilizing padding to standardize the lengths, within the context of an otherwise similar implementation.

---

Algorithm 5 Regex Search

```
  Input
    string := plaintext character string
    init_state := binary representation of initial state
        dfa := encrypted DFA
  bi_rep_table := binary representation of all integers up
                  to number of states, in a 2-D table
  Output ⎧ 1  if dfa accepts string
        ⎨ 0  otherwise
        ⎩

Procedure
  1: curr_state ← initial_state
  2: for c ∈ string do
  3:    hot_vec ← create_one_hot(curr_state, bi_rep_table)
  4:    next_state ← [ ]
  5:    for i ≤ bit_length(dfa.num_states) do
  6:       bitTable ← dfa.bitTable[c][i]
  7:       bit ← dot_prod(hot_vec. bitTable[i][c])
  8:       next_state ← next_state.append(bit)
  9:    end for
 10:    curr_state ← next_state
 11: end for
 12: one_hot ← create_one _hot(curr_state)
 13: result ← dot_prod(one_hot, dfa.accepting_states)
 14: return result
```

---

Moreover, according to some example embodiments, a parallel implementation for regular expression search may be implemented. In this regard, because, for example, TFHE may not support ciphertext packing, an FHE regular expression search as described above may not be made parallel in a direct manner, for example, in the way as the substring search. However, at the hardware or software level, for example, a NuFHE library may support SIMD capabilities and may therefore be configured to execute a same logic gate homomorphically on multiple inputs at a higher throughput rate than executing each homomorphic gate sequentially. Accordingly, a parallel implementation for regular expression search may comprise evaluating Algorithm 5 on multiple input strings in parallel, where each operation and subroutine is performed in a SIMD manner.

With respect to a more specific example embodiment, regular expression search protocol may be implemented in Python using the NuFHE library for TFHE. In this regard, the example embodiment was performed on an Nvidia Tesla V100 GPU (graphics processing unit). Default encryption parameters for NuFHE were used, thereby achieving 80-bit security. Since some example embodiments of the regular expression search employ a streaming algorithm that processes one input character at a time, runtime for the search may be proportional to the length of the document(s) being searched. An average runtime to process a single character may be used as a basis for speed comparisons, which, in this example, may be computed by averaging a total runtime for a given set of documents having a length of 32 characters. Accordingly, as shown in Table 7, a single-document protocol may achieve a per-character latency of under 1 second, and a parallel implementation, as described herein, may have approximately twice the latency while processing 32× more documents, resulting in a 16× improvement in throughput. In this regard, referring to Table 7, the first column indicates the number of states for the regular expression query, the second column indicates the per-character latency in a sequenced-only implementation, and the third column indicates the per-character latency for the parallel implementation as mentioned above.

TABLE 7

| regex num_states | runtime (s) | parallel runtime (s) |
|---|---|---|
| 5 | 0.68 | 0.92 |
| 6 | 0.69 | 0.97 |
| 7 | 0.69 | 1.00 |
| 8 | 0.60 | 1.07 |
| 9 | 0.73 | 1.37 |
| 10 | 0.76 | 1.36 |
| 11 | 0.75 | 1.46 |
| 12 | 0.73 | 1.49 |
| 13 | 0.74 | 1.54 |
| 14 | 0.75 | 1.56 |
| 15 | 0.73 | 1.58 |

The descriptions of the substring search and the regular expression search address single query PIR implementations. However, according to some example embodiments, such implementations may be expanded by employing logical combinations of queries. To do so, according to some example embodiments, the substring search or regular expression search implementations for each individual logical query may be performed in parallel, and then the results of the searches may be combined using a logic gate (e.g., an XOR or AND gate) for the combined query. Reflecting back on the Interpol example mentioned above, Interpol may only be interested in documents that contain information about their person of interest (POI) and an organization with which the POI is associated. A search, according to some example embodiments, for both the POI and the organization may be performed with the results being vectors that reflect documents that contain the POI or the organization. However, by homomorphically applying a logical AND gate on the result vectors, a combined vector may be generated that returns only documents with both the POI and the organization. Therefore, according to some example embodiments, the search implementations can be adapted to any arbitrary Boolean circuit of logical combinations of queries to generate more tailored results, while still operating on encrypted information due to the capabilities of the homomorphic encryption. Moreover, the results and any Boolean gates or circuits that operate on the results, as described above, may also be privately protected, in accordance with some example embodiments, using private function evaluations techniques, such as universal circuits.

As such, according to some example embodiments, search implementations are provided that perform PIR using variable-length queries that are performed securely in a non-resource-exhaustive manner. However, the performance can be affected by the complexity of fully homomorphic operations. In some instances, a tradeoff may exist between execution time and a size of exchange or database for encrypted data. However, according to some example embodiments, a security level may remain constant for the search implementations despite changes in queries or the size of the database.

Figure 6:
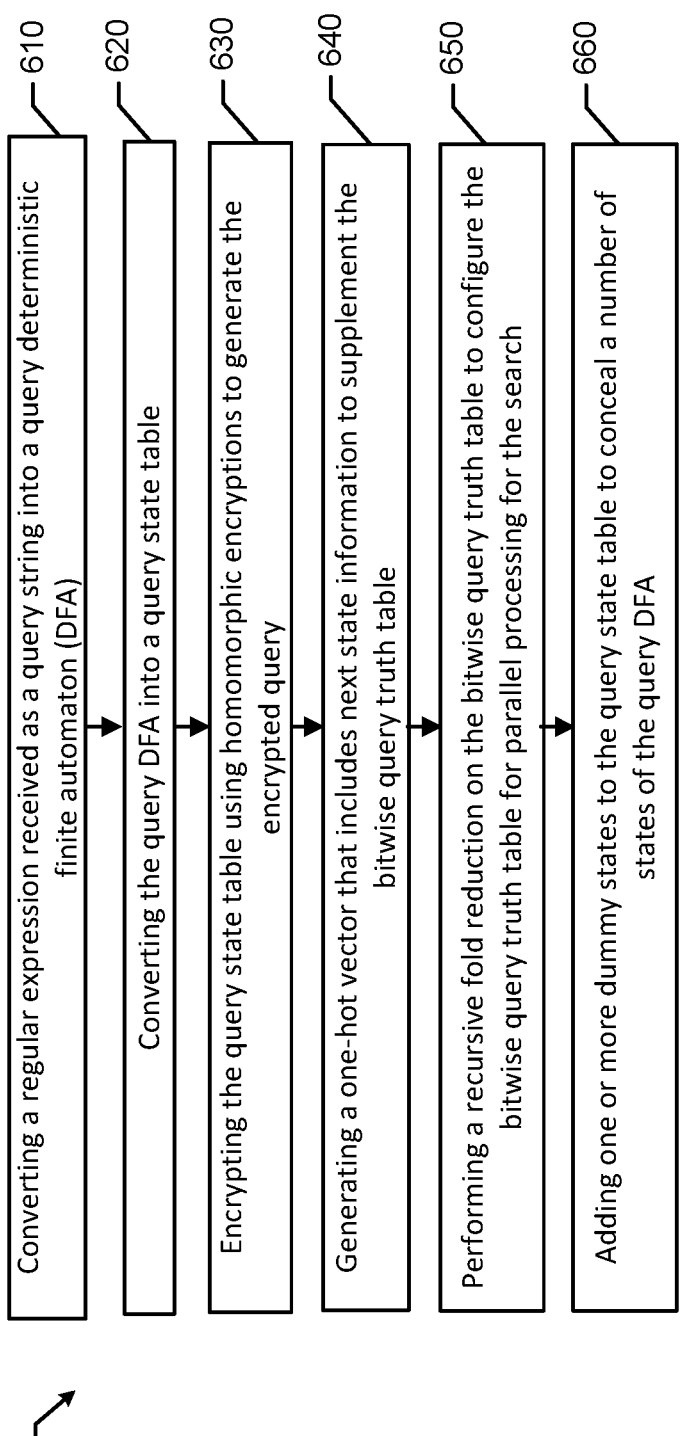
FIG. 6 illustrates an example flowchart for performing a private information retrieval via a regular expression search according to an example embodiment.

Based on the foregoing, another example embodiment of method of performing a regular expression search, according to some example embodiments, is provided as shown in the flowchart 600 of FIG. 6. In this regard, the example method may comprise, at 610, converting a regular expression received as a query string into a query deterministic finite automaton (DFA), and, at 620, converting the query DFA into a query state table. Additionally, at 630, the example method may comprise encrypting the query state table using homomorphic encryptions to generate the encrypted query. According to some example embodiments, the query state table may be generated as a bitwise query state table. Further, the example method may also comprise, at 640, generating a one-hot vector that includes next state information to supplement the bitwise query truth table, where a next state is determined via a homomorphic dot product operation using the one-hot vector. According to some example embodiments, the example method may further comprise, at 650, performing a recursive fold reduction on the bitwise query truth table to configure the bitwise query truth table for parallel processing for the search. Also, according to some example embodiments, the example method, at 660, may comprise adding one or more dummy states to the query state table to conceal a number of states of the query DFA. The addition of dummy states may be performed, according to some example embodiments, as part of a setup phase of the query state table. As such, according to some example embodiments, the addition of the dummy states may be performed, for example, as part of, or immediately after, converting the query DFA into the query state table at 620.

Figure 7:
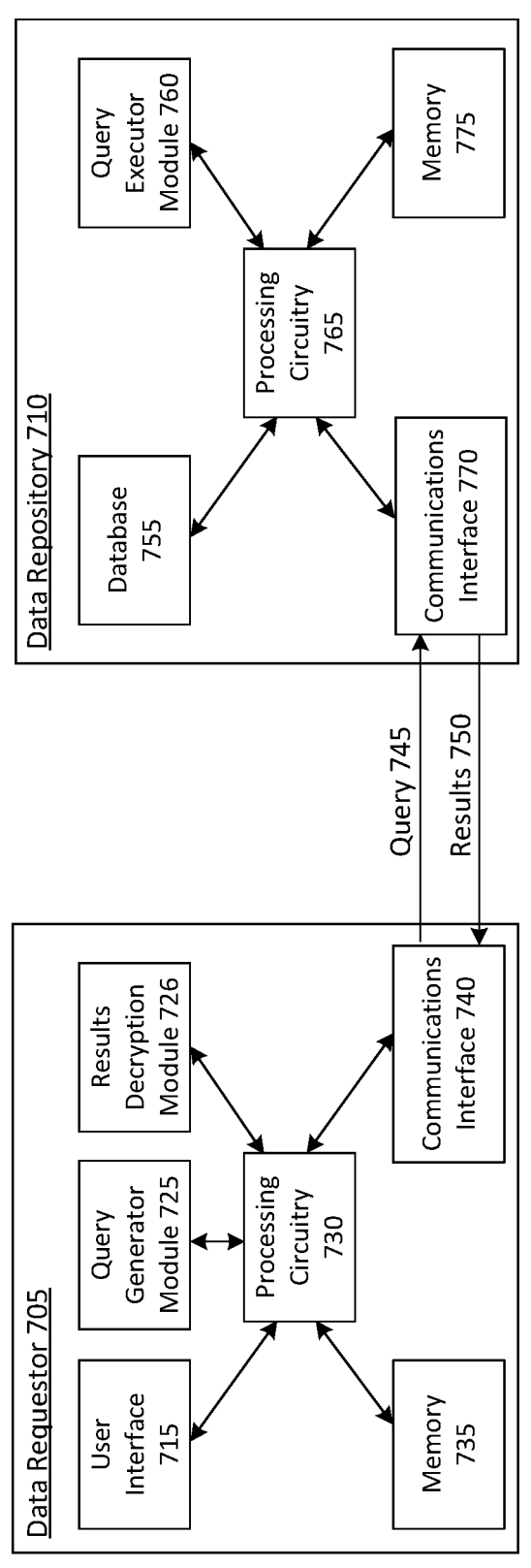
FIG. 7 illustrates block diagram of a data requestor and a data repository according to an example embodiment.

Having described various example embodiments at least with respect to example methods, the following provides a more detailed description of the hardware configurations that may be configured to implement the various example embodiments. In this regard, FIG. 7 provides a more detailed example of a system 700 for private information retrieval according to some example embodiments and may be used to, for example, perform the methods described herein. The system 700 may operate in the same or similar manner as the system 100 of FIG. 1. In this regard, the data requestor 705 may operate in the same or similar manner as the data requestor 110, and the data repository 710 may operate in the same or similar manner as the data repository 120. Additionally, query 745 may be same or similar to query 160 and results 750 may be the same or similar to the results 170.

Accordingly, FIG. 7 shows block diagrams of some internal components of the data requestor 705 and the data repository 710, both of which may be computer systems. Beginning with the data requestor 705, the data requestor 705 may comprise processing circuitry 730 in operable communication with an user interface 715, a query generator module 725, a results decryption module 726, a memory 735, and a communications interface 740. In particular, the query generator module 725 and the results decryption module 726 may include or otherwise be in communication with processing circuitry 730 that is configurable to perform actions in accordance with example embodiments described herein including the actions described with respect to data requestor 110.

The communication interface 740 may include one or more interface mechanisms for enabling communication with other devices, such as the data repository 710 to send the query 745 and receive the results 750. In some cases, the communication interface 740 may be any means such as a device or circuitry embodied in either hardware, or a combination of hardware and software that is configured to receive or transmit data from/to devices in communication with the processing circuitry 730.

The user interface 715 may include one or more interface mechanisms (e.g., keyboard, touch screen, mouse, monitor, or the like) for enabling users to input and interface with data (e.g., a search pattern) to be operated upon by the processing circuitry 730. In some cases, the user interface 715 may be any means such as a device or circuitry embodied in either hardware, or a combination of hardware and software that is configured to receive and provide data to the processing circuitry 730 to perform various functionalities as provided herein. Further, in some cases, the user interface 715 may be any means such as a device or circuitry embodied in either hardware, or a combination of hardware and software that is configured to output data to a user as provided by the processing circuitry 730 to perform various functionalities as provided herein. According to some example embodiments, a query string may be received by the processing circuitry 730 via the user interface 715.

In an exemplary embodiment, the memory 735 may include one or more non-transitory memory devices such as, for example, volatile or non-volatile memory that may be either fixed or removable. The memory 735 may be configured to store information, data, applications, instructions or the like for enabling the query generator module 725 and the results decryption module 726 to carry out various functions in accordance with exemplary embodiments of the present invention. For example, the memory 735 could be configured to buffer input data for processing by the processing circuity 730. Additionally or alternatively, the memory 735 could be configured to store instructions for execution by the processing circuitry 730. Among the contents of the memory 735, applications may be stored for execution by the processing circuitry 730 in order to carry out the functionality associated with each respective application. In some cases, the applications may include directions associated with the query generator module 725 and the results decryption module 726.

The processing circuitry 730 may be embodied in a number of different ways. For example, the processing circuitry 730 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processing circuitry 730 may be configured to execute instructions stored in the memory 735 or otherwise accessible to the processing circuitry 730. As such, whether configured by hardware or by a combination of hardware and software, the processing circuitry 730 may represent an entity (e.g., physically embodied in circuitry—in the form of processing circuitry 730) capable of performing operations according to embodiments of the present invention while configured accordingly. Thus, for example, when the processing circuitry 730 is embodied as an ASIC, FPGA or the like, the processing circuitry 730 may be specifically configured hardware for conducting the operations described herein. Alternatively, as another example, when the processing circuitry 730 is embodied as an executor of software instructions, the instructions may specifically configure the processing circuitry 730 to perform the operations described herein.

In an example embodiment, the processing circuitry 730 may be embodied as, include or otherwise control the query generator module 725 and the results decryption module 726. As such, in some embodiments, the processing circuitry 730 may be said to cause each of the operations described in connection with the query generator module 725 and the results decryption module 726 to undertake the corresponding functionalities responsive to execution of instructions or algorithms configuring the processing circuitry 730 accordingly. For example, the processing circuitry 730 may provide programmable control signals, selections, and the like to control the operation of the data requestor 705 in accordance with the query generator module 725 and the results decryption module 726 responsive to execution of instructions stored in the memory 735.

The query generator module 725 may be embodied in hardware of the processing circuitry 730 or embodied in the hardware of the processing circuitry as configured by instructions stored in the memory 735. In this regard, the query generator module 725 may be configured to receive a query string. The query string may be received from, for example, the user interface 715. According to some example embodiments, the query generator module 725 may also homomorphically encrypt the query string to generate an encrypted query. According to some example embodiments, the query generator module 725 may also transmit the encrypted query (as query 745) to the data repository 710 via the communication interface 740.

According to some example embodiments, the communications interface 740 may communicate with the communications interface 770 via a network. According to some example embodiments, the network may be a public network, such as, for example, the Internet. As such, the communications interface 740 may communicate with the communications interface 770 to provide the encrypted query via, for example, a public network. Such a network connection may be necessary when, for example, the data requestor 705 (e.g., data requestor computer) is operated on a separate network than the data repository 710. In some example embodiments, the separate network may be operated by a separate network operator or by a different legal entity (e.g., company, country, government agency, individual, etc.) than the data repository 710 (e.g., data repository computer). In some example embodiments, the separate networks for the data requestor 705 and the data repository 710 may have different network security platforms having different security elements (e.g., firewalls, portals, etc.) with different access permissions.

According to some example embodiments, the query generator module 725 may be further configured to convert a regular expression (e.g., received via the user interface 715) into a query deterministic finite automaton (DFA).

Additionally, the query generator module 725 may be configured to convert the query DFA into a query state table, and encrypt the query state table using homomorphic encryptions to generate the encrypted query. According to some example embodiments, the query generator module 725 may be configured to generate the query state table as a bitwise query truth table, and, in some example embodiments, generate a one-hot vector that includes next state information to supplement the bitwise query truth table. In this regard, during a search, a next state may be determined via a homomorphic dot product operation using the one-hot vector. Further, according to some example embodiments, the query generator module 725 may be configured to add one or more dummy states to the query state table to conceal a number of states of the query DFA. With respect to encryption, the query generator module 725 may be configured to encrypt the query string via HE, and more specifically via FHE or SHE. According to some example embodiments, the query generator module 725 may also generate a second encrypted query based on a received second query string in preparation for serial homomorphic computations on the results of different queries.

The results decryption module 726 may be embodied in hardware of the processing circuitry 730 or embodied in the hardware of the processing circuitry as configured by instructions stored in the memory 735. In this regard, the results decryption module 726 may be configured to decrypt resultant encrypted datasets received from the data repository 710 as the results 750, using, for example, a private key. The decrypting may be performed to analyze and evaluate the resultant datasets with respect to the requested information.

With respect to the data repository 710, the data repository 710 may comprise processing circuitry 765 in operable communication with a database 755, a query executor module 760, a memory 775, and a communications interface 770. In particular, the query executor module 760 may include or otherwise be in communication with processing circuitry 765 that is configurable to perform actions in accordance with example embodiments described herein including the actions described with respect to data repository 120 and the query executor 130.

The communication interface 770 may include one or more interface mechanisms for enabling communication with other devices, such as the data requestor 705 to receive the query 745 and send the results 750. In some cases, the communication interface 770 may be any means such as a device or circuitry embodied in either hardware, or a combination of hardware and software that is configured to receive or transmit data from/to devices in communication with the processing circuitry 765 and resultant encrypted datasets.

The database 755 may be a collection of data records stored on a tangible memory device and accessible for reading or writing by the processing circuitry 765. According to some example embodiments, the database 755 may be remote from the processing circuitry 765 and may be accessible to the processing circuitry 765 via the communication interface 770. Via the processing circuitry 765, the query executor module 760 may be configured to query the datasets in the database 755. According to some example embodiments, the database 755 may store datasets, such as documents, in a native format that is not metadata or extracted fields. Accordingly, since the dataset are stored in a native format, the homomorphic encryption of the datasets includes the information of the dataset that is in the native format to permit searching via homomorphic computations.

In an exemplary embodiment, the memory 775 may include one or more non-transitory memory devices such as, for example, volatile or non-volatile memory that may be either fixed or removable. The memory 775 may be configured to store information, data, applications, instructions or the like for enabling the query executor module 760 to carry out various functions in accordance with exemplary embodiments of the present invention. For example, the memory 775 could be configured to buffer input data for processing by the processing circuitry 765. Additionally or alternatively, the memory 775 could be configured to store instructions for execution by the processing circuitry 765. Additionally or alternatively, some or all of the memory 775 may be allocated to be a results buffer. Among the contents of the memory 775, applications may be stored for execution by the processing circuitry 765 in order to carry out the functionality associated with each respective application. In some cases, the applications may include directions associated with the query executor module 760.

The processing circuitry 765 may be embodied in a number of different ways. For example, the processing circuitry 765 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processing circuitry 765 may be configured to execute instructions stored in the memory 775 or otherwise accessible to the processing circuitry 765. As such, whether configured by hardware or by a combination of hardware and software, the processing circuitry 765 may represent an entity (e.g., physically embodied in circuitry—in the form of processing circuitry 765) capable of performing operations according to embodiments of the present invention while configured accordingly. Thus, for example, when the processing circuitry 765 is embodied as an ASIC, FPGA or the like, the processing circuitry 765 may be specifically configured hardware for conducting the operations described herein. Alternatively, as another example, when the processing circuitry 765 is embodied as an executor of software instructions, the instructions may specifically configure the processing circuitry 765 to perform the operations described herein.

In an example embodiment, the processing circuitry 765 may be embodied as, include or otherwise control the query executor module 760. As such, in some embodiments, the processing circuitry 765 may be said to cause each of the operations described in connection with the query executor module 760 to undertake the corresponding functionalities responsive to execution of instructions or algorithms configuring the processing circuitry 765 accordingly. For example, the processing circuitry 765 may provide programmable control signals, selections, and the like to control the operation of the data repository 710 in accordance with the query executor module 760 responsive to execution of instructions stored in the memory 775.

The query executor module 760 may be embodied in hardware of the processing circuitry 765 or embodied in the hardware of the processing circuitry as configured by instructions stored in the memory 775. In this regard, the query executor module 760 may be configured to perform a private query, based on the content of the query 745 (e.g., a query string), against the database 755. In this regard, according to some example embodiments, the query executor module 760 may be configured to, for example, encrypt the database 755 (or substrings of the database) using HE, and more specifically, in some example embodiments, somewhat homomorphic encryption (SHE) or fully homomorphic encryption (FHE). Further, according to some example embodiments, the query executor module 760 may be configured to access the database 755, and the database 755 may comprise a plurality of datasets, which may, but need not be, encrypted. In this regard, each of the datasets in the plurality of datasets may be homomorphically encrypted. According to some example embodiments, the query executor module 760 may also be configured to receive the encrypted query, and perform a search of the plurality of datasets, which may be encrypted, to identify resultant encrypted datasets that include data that matches the encrypted query. In this regard, performing the search may comprise maintaining encryption of the encrypted query while performing computational operations of the search. According to some example embodiments, performing the search may comprise maintaining encryption of the encrypted query and the plurality of encrypted datasets while performing computational operations of the search. Moreover, the resultant encrypted datasets may be homomorphically encrypted. According to some example embodiments, the query executor module 760 may be configured to transmit the resultant encrypted datasets to the data requestor via the communications interface 770.

According to some example embodiments, the query executor module 760 may be configured to implement more than one query. In this regard, for example, the query executor module 760 may be configured to determine second resultant encrypted datasets based on a second query string, and generate third resultant encrypted datasets from the first resultant encrypted datasets and the second resultant encrypted datasets by performing homomorphic computations with the first resultant encrypted datasets and the second resultant encrypted datasets. Additionally, to perform the search, query executor module 760 may be configured to hash the encrypted query to generate a hashed encrypted query and extract a plurality of substrings from the plurality of datasets. Additionally, according to some example embodiments, the substrings may be extracted as encrypted substrings, or the substrings may be encrypted after being extracted. According to some example embodiments, such substrings may be extracted based on a characteristic of the query string or the encrypted query. In this regard, the plurality of substrings may be extracted such that each substring has a same length as the encrypted query. Further, the query executor module 760 may be configured to hash each of the encrypted substrings to generate a plurality of hashed encrypted substrings, and homomorphically subtract the hashed encrypted query with each of the hashed encrypted substrings to identify matching substrings for use in determining the resultant encrypted data sets.

According to some example embodiments, the query executor module 760 may also be configured to generate a raw results vector for each encrypted dataset, and transform each raw results vector with a match into a binary indicator vector having a true binary value at a position associated with a matched substring of the encrypted dataset and a false binary value at a position associated with an unmatched substring of the encrypted dataset. In this regard, the false binary values may be generated by converting unmatched values resulting from the homomorphic subtraction to the false binary value. According to some example embodiments, the query executor module 760 may also be configured to, for each binary indicator vector, perform a spreading operation to spread the true binary value to positions within binary indicator vectors having a true binary value to remove position-based matching information from the binary indicator vector and also identify the resultant encrypted datasets. Additionally, according to some example embodiments, the query executor module 760 may be configured to generate a raw results vector based on the homomorphic subtractions, and transform the raw results vector into a binary indicator vector having interleaved values to support parallel homomorphic subtractions with result values being populated into the binary indicator vector using interleaving.

According to some example embodiments, the query executor module 760 may be configured to operate on an encrypted query string that a regular expression. Additionally, the query executor module 760 may be further configured to perform a recursive fold reduction on the bitwise query truth table to configure the bitwise query truth table for parallel processing for the search.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the invention set forth herein will come to mind to one skilled in the art having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for performing private information retrieval, the system comprising:
a data requesting computer;
wherein the data requesting computer is configured to:
receive a query string;
homomorphically encrypt the query string to generate an encrypted query;
transmit the encrypted query to a data repository computer;
receive resultant encrypted datasets;
wherein the data repository computer is configured to:
access a database comprising a plurality of datasets;
receive the encrypted query;
perform a search of the plurality of datasets to identify the resultant encrypted datasets that include data that matches the encrypted query, wherein performing the search comprises maintaining encryption of the encrypted query while performing computational operations of the search, wherein the resultant encrypted datasets are homomorphically encrypted;
wherein the query string is a regular expression, wherein the data requesting computer is further configured to:
convert the regular expression into a query deterministic finite automaton (DFA),
convert the query DFA into a query state table, and
encrypt the query state table using homomorphic encryptions to generate the encrypted query; and
transmit the resultant encrypted datasets to the data requesting computer.

2. The system of claim 1, further comprising a public network;
wherein the data requesting computer and the data repository computer communicate the encrypted query and resultant encrypted datasets via the public network; and
wherein the data requesting computer is operated on a separate network from the data repository computer.

3. The system of claim 1, wherein the plurality of datasets comprises a plurality of encrypted datasets, each of the encrypted datasets in the plurality of encrypted datasets being homomorphically encrypted;
wherein the plurality of encrypted datasets are encryptions of documents in a native format; and
wherein the data repository computer is configured to perform the computational operations of the search on the encryptions of documents in the native format.

4. The system of claim 3, wherein the encrypted query and the plurality of encrypted datasets are encrypted using somewhat homomorphic encryption (SHE) or fully homomorphic encryption (FHE).

5. The system of claim 1, wherein the query string is a first query string and the resultant encrypted datasets are first resultant encrypted datasets;
wherein the data repository computer is further configured to:
determine second resultant encrypted datasets based on a second query string; and
generate third resultant encrypted datasets from the first resultant encrypted datasets and the second resultant encrypted datasets by performing homomorphic computations with the first resultant encrypted datasets and the second resultant encrypted datasets.

6. The system of claim 1, wherein, to perform the search, the data repository computer, is configured to:
hash the encrypted query to generate a hashed encrypted query, wherein a plurality of substrings are extracted from the plurality of datasets such that each substring has a same length as the encrypted query;
encrypt and hash each of the substrings to generate a plurality of hashed encrypted substrings; and
homomorphically subtract the hashed encrypted query with each of the hashed encrypted substrings to identify matching substrings for use in determining the resultant encrypted datasets.

7. The system of claim 6, wherein, to perform the search, the data repository computer is further configured to:
generate a raw results vector for each dataset; and
transform each raw results vector with a match into a binary indicator vector having a true binary value at a position associated with a matched substring of the dataset and a false binary value at a position associated with an unmatched substring of the dataset, wherein the false binary values are generated by converting unmatched values resulting from the homomorphic subtraction to the false binary value.

8. The system of claim 7, wherein, to perform the search, the data repository computer is further configured to:
for each binary indicator vector, perform a spreading operation to spread the true binary value to positions within binary indicator vectors having a true binary value to remove position-based matching information from the binary indicator vector and also identify the resultant encrypted datasets.

9. The system of claim 6, wherein, to perform the search, the data repository computer is further configured to:
generate a raw results vector based on the homomorphic subtractions; and
transform the raw results vector into a binary indicator vector having interleaved values to support parallel homomorphic subtractions with result values being populated into the binary indicator vector using interleaving.

10. The system of claim 1, wherein data requesting computer is configured to generate the query state table as a bitwise query truth table.

11. The system of claim 10, wherein the data requesting computer is further configured to generate a one-hot vector that includes next state information to supplement the bitwise query truth table, where a next state is determined via a homomorphic dot product operation using the one-hot vector.

12. The system of claim 10, wherein the data repository computer is further configured to perform a recursive fold reduction on the bitwise query truth table to configure the bitwise query truth table for parallel processing for the search.

13. The system of claim 1, wherein the data requesting computer is further configured to add one or more dummy states to the query state table to conceal a number of states of the query DFA.

14. A method for performing private information retrieval, the method comprising:

accessing, by a data repository computer, a database comprising a plurality of datasets;

receiving an encrypted query, the encrypted query being a homomorphically encrypted query string;

performing a search of the plurality of datasets to identify resultant encrypted datasets that include data that matches the encrypted query, wherein performing the search comprises maintaining encryption of the encrypted query while performing computational operations of the search, wherein the resultant encrypted datasets are homomorphically encrypted, wherein the query string is a regular expression, and the method further comprises:

converting the regular expression into a query deterministic finite automaton (DFA);

converting the query DFA into a query state table; and encrypting the query state table using a homomorphic encryption to generate the encrypted query; and transmitting the resultant encrypted datasets to a data requesting computer.

15. The method of claim 14, wherein performing the search comprises:

hashing the encrypted query to generate a hashed encrypted query;

extracting a plurality of substrings from the plurality of datasets, wherein the plurality of substrings are extracted such that each substring has a same length as the encrypted query;

encrypting and hashing each of the substrings to generate a plurality of hashed encrypted substrings; and homomorphically subtracting the hashed encrypted query with each of the hashed encrypted substrings to identify matching substrings for use in determining the resultant encrypted datasets.

16. The method of claim 15, wherein performing the search further comprises:

generating a raw results vector for each dataset; and transforming each raw results vector with a match into a binary indicator vector having a true binary value at a position associated with a matched substring of the dataset and a false binary value at a position associated with an unmatched substring of the dataset, wherein the false binary values are populated by converting unmatched values resulting from the homomorphic subtraction to the false binary value.

17. The method of claim 14, wherein the data requesting computer is configured to generate the query state table as a bitwise query truth table; and wherein the method further comprises generating a one-hot vector that includes next state information to supplement the bitwise query truth table, where a next state is determined via a homomorphic dot product operation using the one-hot vector.

18. An apparatus for performing private information retrieval, the apparatus comprising processing circuitry configured to:

access a database comprising a plurality of datasets;

receive, via a public network, an encrypted query, the encrypted query being a homomorphically encrypted query string;

perform a search of the plurality of datasets to identify resultant encrypted datasets that include data that matches the query, wherein performing the search comprises maintaining encryption of the encrypted query while performing computational operations of the search, wherein the resultant encrypted datasets are homomorphically encrypted, wherein the query is a regular expression, and the processing circuitry is further configured to:

convert the regular expression into a query deterministic finite automaton (DFA);

convert the query DFA into a query state table; and encrypt the query state table using a homomorphic encryption to generate the encrypted query; and transmit the resultant encrypted datasets to a data requesting computer via the public network.

* * * * *